(12) United States Patent
Haddon

(10) Patent No.: US 9,459,694 B2
(45) Date of Patent: Oct. 4, 2016

(54) CURSOR MOVEMENT DEVICE

(71) Applicant: John Haddon, Farnham (GB)

(72) Inventor: John Haddon, Farnham (GB)

( * ) Notice: Subject to any disclaimer, the term of this patent is extended or adjusted under 35 U.S.C. 154(b) by 0 days.

(21) Appl. No.: 14/418,345

(22) PCT Filed: Jul. 29, 2013

(86) PCT No.: PCT/GB2013/052024
§ 371 (c)(1),
(2) Date: Jan. 29, 2015

(87) PCT Pub. No.: WO2014/020323
PCT Pub. Date: Feb. 6, 2014

(65) Prior Publication Data
US 2015/0199005 A1    Jul. 16, 2015

(30) Foreign Application Priority Data
Jul. 30, 2012  (GB) .................................. 1213538.0

(51) Int. Cl.
*G06F 3/01* (2006.01)
*G06F 3/038* (2013.01)
*G06F 3/0486* (2013.01)
*G06F 3/0354* (2013.01)

(52) U.S. Cl.
CPC ............... *G06F 3/013* (2013.01); *G06F 3/038* (2013.01); *G06F 3/0354* (2013.01); *G06F 3/03543* (2013.01); *G06F 3/0486* (2013.01); *G06F 2203/0381* (2013.01)

(58) Field of Classification Search
CPC ..... G06F 19/34; G06F 19/3406; G06F 19/32
See application file for complete search history.

(56) References Cited

U.S. PATENT DOCUMENTS

| | | | |
|---|---|---|---|
| 6,204,828 B1* | 3/2001 | Amir ....................... | G06F 3/013 345/156 |
| 2009/0315827 A1* | 12/2009 | Elvesjo ................... | G06F 3/013 345/157 |
| 2011/0299034 A1* | 12/2011 | Walsh ...................... | A61B 3/102 351/206 |
| 2012/0272179 A1* | 10/2012 | Stafford .................. | G06F 3/012 715/781 |

* cited by examiner

*Primary Examiner* — Olga Merkoulova
(74) *Attorney, Agent, or Firm* — Gable Gotwals

(57) ABSTRACT

The position of a symbol presented on a visual display unit is selectively controlled by either physical movement information (e.g. mouse movement) or the user's gaze position. Rapid and/or significant change in determined gaze position to a position on the visual display unit followed by the determined gaze position lingering at the position will cause the system to use the user's gaze position to move the symbol else the physical movement information is used.

24 Claims, 5 Drawing Sheets

CURSOR MOVEMENT DEVICE

CROSS-REFERENCE TO RELATED APPLICATIONS

This application is the United States National Phase of PCT Patent Application No. GB2013/052024 filed 29 Jul. 2013, which claims priority to British Application No. 1213538.0 filed 30 Jul. 2012, which is incorporated herein by reference.

BACKGROUND OF THE INVENTION

1. Technical Field

This invention relates to improvements to the control of the position of a position indicator presented on a media screen such as a visual display unit.

2. Background of the Invention

When interacting with content displayed on a screen or screens of a visual display unit or units, it has become established practice to use a cursor to interact with the content through a graphical user interface (GUI). Movement of the cursor to a required position on the screen(s) to click and select an object or position within the content displayed is familiar to most people. In a traditional cursor control device, such as a 'mouse', a user physically moves the mouse in such a way that the cursor moves across the screen(s) to a position that the user wishes the cursor to be positioned at. This use of the traditional mouse can take up to 1-3 seconds to move the cursor from one part of the screen to another, which can be exacerbated when content is displayed across more than one VDU. To effect large cursor movements with the traditional mouse can require a number of separate physical movements, for example, when the mouse mat is not large enough for movement of the mouse across the mat to correspond to full movement of the cursor across the VDU screen. The separate movements are frequently in the form of a movement of the mouse across the mat, lifting the mouse from the mat followed by an aerial movement of the mouse back across the mat where this is intended not to move the cursor on the VDU screen, followed by a further movement of the mouse across the mat to move the cursor. This process may need to be undertaken a number of times before the cursor has been moved the required distance across the screen or screens before arriving at the desired position. This movement of a traditional mouse has been linked with repetitive strain injuries, and may be particularly problematic to people with limited mobility.

The present invention was made in an attempt to solve these problems.

SUMMARY OF THE INVENTION

In the present claimed apparatus a user uses a combination of a traditional pointing device and their eyes to control where a cursor should be positioned on the screen or screens of a visual display unit or units. The apparatus assesses whether the user wants to control the position of a cursor using their gaze position or an input device such as a conventional mouse. The cursor may be positioned on the screen or screens of a visual display unit or units.

In a first aspect, there is provided apparatus arranged to move a symbol presented on a visual display unit to a desired position comprising,
a processing means;
a movement means configured to collect physical movement information from a user;
a gaze direction means configured to collect visual gaze direction information and to determine gaze positions of the user;
wherein the processing means is configured to selectively control the position of a symbol presented on a visual display unit based on either the physical movement information or the determined gaze positions;
the processing means is configured to use predetermined criteria to determine whether the position of the symbol presented on the visual display unit is to be controlled based on the physical movement information or is to be controlled based on the determined gaze positions in order for the symbol presented on the visual display unit to be moved to the desired position;
wherein the predetermined criteria is based on detection of a rapid and/or significant change in determined gaze position to a position on the visual display unit followed by the determined gaze position lingering at the position;
wherein if the predetermined criteria are satisfied, control of the position of the symbol presented on the visual display unit is based on the determined gaze position; and
if the predetermined criteria are not satisfied, control of the position of the symbol presented on the visual display unit is based on the physical movement information.

Preferably, the movement means comprises a computer peripheral device.

Preferably, the computer peripheral device includes a computer mouse and/or touch sensitive pad and/or tracker pad and/or roller ball, and/or pen pads and/or graphic pads and/or keyboard.

Preferably, the processing means is configured to use processed physical movement information to control the position of the symbol on the VDU.

Preferably, content presented on the VDU is presented within a Graphical User Interface 'GUI' rendered on the VDU.

In a second aspect there is provided a method of moving a symbol presented on a visual display unit to a desired position comprising:
using a movement means to collect physical movement information from a user;
using a gaze direction means to collect visual gaze direction information and to determine gaze positions of the user;
using a processing means to selectively control the position of a symbol presented on a visual display unit based on either the physical movement information or the determined gaze positions;
wherein the processing means uses predetermined criteria to determine whether the position of the symbol presented on the visual display unit is to be controlled based on the physical movement information or is to be controlled based on the determined gaze positions in order for the symbol presented on the visual display unit to be moved to the desired position;
wherein the predetermined criteria is based on detection of a rapid and/or significant change in determined gaze position to a position on the visual display unit followed by the determined gaze position lingering at the position;
wherein if the predetermined criteria are satisfied, control of the position of the symbol presented on the visual display unit is based on a determined gaze position; and
if the predetermined criteria are not satisfied, control of the position of the symbol presented on the visual display unit is based on the physical movement information.

Preferably, the movement means comprises a computer peripheral device.

Preferably, the computer peripheral device includes a computer mouse and/or touch sensitive pad and/or keyboard.

Preferably, the processing means is configured to use processed physical movement information to control the position of the symbol on the VDU.

Preferably, a gaze tracker is used to collect the visual gaze direction information from the user.

Preferably, the gaze tracker comprises an eye tracker.

Preferably, the visual gaze direction information is processed to determine the gaze position.

Preferably, predetermined criteria to determine whether the position of the symbol presented on the VDU is to be controlled by physical movement information or is to be based on the gaze position is based on a rapid and/or significant change in gaze position, wherein the rapid and/or significant change in gaze position comprises a change in gaze position greater than a significant dimension of the VDU.

Preferably, predetermined criteria to determine whether the position of the symbol presented on the VDU is to be controlled by physical movement information or is to be based on the gaze position is based on a rapid and/or significant change in gaze position, wherein the rapid and/or significant change in gaze position comprises a change in gaze position greater than a threshold distance on the VDU.

Preferably, wherein the threshold distance on the VDU, comprises a function of the variation of the gaze position.

Preferably, the function of the variation of the gaze position, comprises the standard deviation of the determined gaze position.

Preferably, the function of the variation of the gaze position, is equal to four times the standard deviation of the determined gaze position.

Preferably, predetermined criteria to determine whether the position of the symbol presented on the VDU is to be controlled by physical movement information or is to be based on the gaze position is based on a rapid and/or significant change in gaze position, wherein the rapid and/or significant change in gaze position comprises a lingering gaze position at the region of interest, wherein the lingering gaze position comprises a gaze position at the region of interest on VDU for a short time period.

Preferably, if physical movement information is being collected, control of the position of the symbol presented on the visual display unit is based on the physical movement information.

Preferably, content presented on the VDU is presented within a Graphical User Interface 'GUI' rendered on the VDU.

In a third aspect, there is provided a computer program comprising program code which, when executed on a processor, will cause the apparatus arranged to move a symbol presented on a visual display unit to a desired position according to the second aspect.

In a fourth aspect, there is provided apparatus arranged to determine a desired calibration useable to determine a user gaze position on a visual display unit 'VDU' from visual gaze direction information of a user, the apparatus comprising:

a processing means;

a movement means configured to collect physical movement information from a user;

a gaze direction means configured to collect visual gaze direction information from the user;

wherein:

the processing means is configured to process the physical movement information to control the position of a symbol presented on the visual display unit; and the processing means is configured to process the visual gaze direction information from the user to determine the desired calibration;

the determination of the desired calibration comprising;

the processing means comparing the visual gaze direction information with the position of the symbol presented on the visual display unit to determine the desired calibration.

Preferably, the movement means is a computer peripheral device.

Preferably, the computer peripheral device comprises a computer mouse and/or touch sensitive pad and/or keyboard.

Preferably, the processing means is configured to control the position of the symbol based on the processed physical movement information as part of the user's interaction with content presented on the VDU.

Preferably, content presented on the VDU is presented within a Graphical User Interface 'GUI' rendered on the VDU.

Preferably, comparing the visual gaze direction information with the position of the symbol presented on the visual display unit to determine the desired calibration comprises processing the visual gaze direction information from the user to determine an apparent user gaze position, and determining the difference between the apparent user gaze position and the position of the symbol.

Preferably, the desired calibration is determined based on an assumption that the gaze position of the user is located at the position of the symbol.

In a fifth aspect there is provided a method of generating a desired calibration useable to determine a user gaze position on a visual display unit 'VDU' from visual gaze direction information of a user, the method comprising:

using a processing means;

using a movement means to collect physical movement information from a user;

using a gaze direction means to collect visual gaze direction information from the user;

wherein:

the processing means is configured to process the physical movement information to control the position of a symbol presented on the visual display unit; and the processing means is configured to process the visual gaze direction information from the user to determine the desired calibration;

the generation of the desired calibration comprising;

the processing means comparing the visual gaze direction information with the position of the symbol presented on the visual display unit to determine the desired calibration.

Preferably, the movement means is a computer peripheral device.

Preferably, the computer peripheral device comprises a computer mouse and/or touch sensitive pad and/or keyboard.

Preferably, the processing means is configured to control the position of the symbol based on the processed physical movement information as part of the user's interaction with content presented on the VDU.

Preferably, the user's interaction with content presented on the VDU comprises controlling the position of the symbol to select content on the VDU.

Preferably, selecting content includes a button click.

Preferably, the method of generating a desired calibration comprises a gaze tracker, wherein the gaze tracker determines the visual gaze direction information from the user.

Preferably, the gaze tracker comprises an eye tracker.

Preferably, processing the visual gaze direction information determines the eye movement of one or both eyes of the user.

Preferably, processing the visual gaze direction information from the user to determine the desired calibration; comprises acquiring visual gaze direction information to be compared with the position of the symbol presented on the visual display unit following a rapid and/or significant eye movement.

Preferably, a rapid and/or significant eye movement comprises, eye movement consistent with looking at positions separated by a significant dimension of the VDU.

Preferably, processing the visual gaze direction information from the user to determine the desired calibration; comprises acquiring visual gaze direction information to be compared with the position of the symbol presented on the visual display unit following a lingering eye movement.

Preferably, comparing the visual gaze direction information with the position of the symbol presented on the visual display unit to provide the desired calibration comprises; correlating the position or positions of the symbol on the VDU with the visual gaze direction information from the user.

Preferably, correlating the position or positions of the symbol on the VDU with the visual gaze direction information from the user comprises linear regression.

Preferably, content presented on the VDU is presented within a Graphical User Interface 'GUI' rendered on the VDU.

Preferably, the processing means includes a personal computer, laptop or other computing device.

Preferably, comparing the visual gaze direction information with the position of the symbol presented on the visual display unit to determine the desired calibration comprises processing the visual gaze direction information from the user to determine an apparent user gaze position, and determining the difference between the apparent user gaze position and the position of the symbol.

Preferably, the desired calibration is determined based on an assumption that the gaze position of the user is located at the position of the symbol.

In a sixth aspect there is provided a computer program comprising program code which, when executed on a processor, will cause the apparatus arranged to determine a desired calibration useable to determine a user gaze position on a VDU from visual gaze direction information of a user according to the fifth aspect.

DETAILED DESCRIPTION

In the following there is generally disclosed apparatus that can be used by a user to move a symbol presented within a Graphical User Interface (GUI) rendered upon a visual display unit using information relating to where the user is looking gathered by a gaze tracking system in combination with traditional symbol movement means such as a 'mouse'. Apparatus to determine a required or desired calibration of the gaze tracking system is also disclosed.

Figure 1:
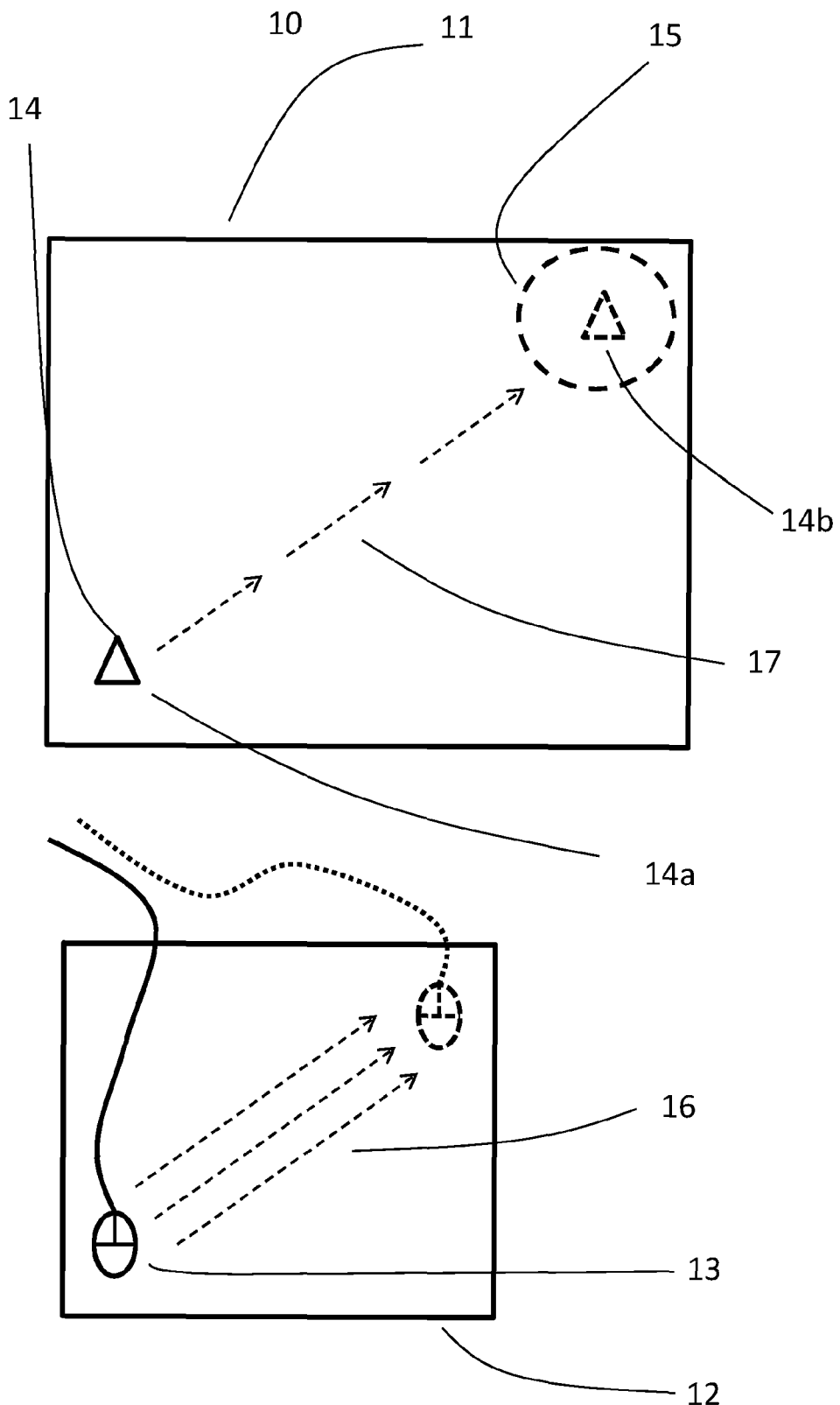
FIG. 1 shows a schematic diagram of a known cursor movement system.

FIG. 1 shows a schematic explanatory diagram of a computer system 10 using traditional means to move a symbol 14 presented in a graphical user interface (GUI) rendered on a visual display unit (VDU) 11; the symbol 14 could be a cursor. A mouse 13 is used to control the movement of the symbol 14 upon the VDU 11. In the situation represented in FIG. 1 the user wishes to move the symbol 14 from a first position 14a to second position 14b on the VDU 11. In a process familiar to most users of computer systems using traditional means to move a symbol, a number of separate movements 16 of the mouse 13 across a mouse mat 12 or part of desk may be required to effect the required movement of the symbol 14 from position 14a to position 14b, with the cursor 14 making a number of individual movements 17 across the VDU 11. The mouse 13 may need to be dragged across the mouse mat 12 or part of desk, lifted above the mouse mat 12 or desk surface and moved back towards where it was moved from, placed back on the mouse mat 12 or part of desk and then dragged back across the mouse mat 12 or part of desk. Sometimes, three, four or more movements may be required; a situation exacerbated when a user uses a GUI spanning more than one VDU at one time. This process can take a significant time to complete the desired movement and has been linked with repetitive strain injuries, and may be particularly problematic for people with limited mobility.

Figure 2:
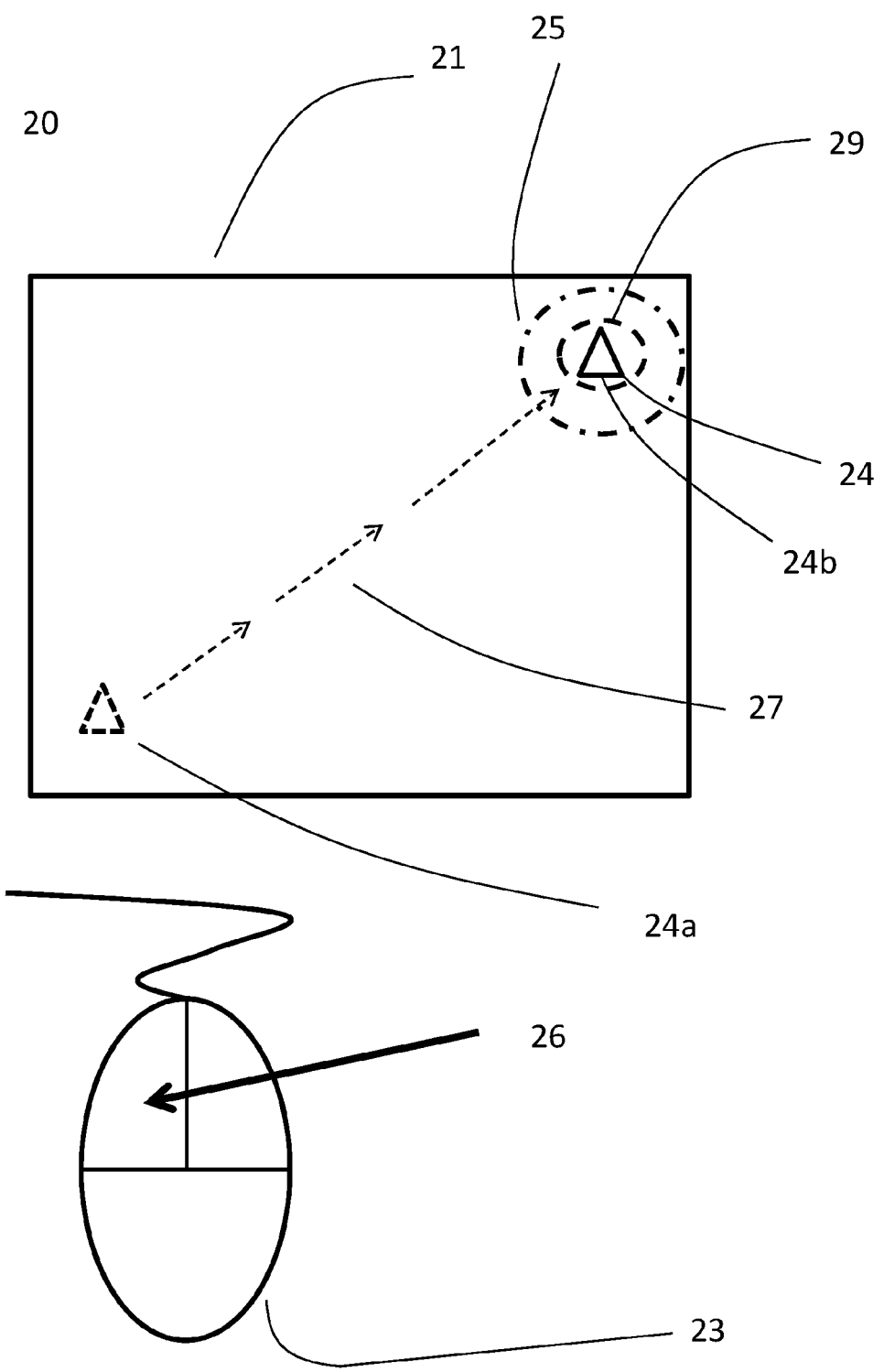
FIG. 2 shows a schematic diagram of a cursor movement system according to the present invention.

FIG. 2 shows a schematic diagram of a computer system 20 incorporating features according to an aspect of the claimed apparatuses of the present invention. In FIG. 2 a symbol 24 is presented in a graphical user interface (GUI) rendered on a visual display unit (VDU) 21. In one example the symbol 24 could be a cursor. In examples where the symbol 24 is a cursor, the symbol 24 could be a cursor that is used to select content that is to be or is being dragged to that position, or could be a cursor that is for example to be positioned at a particular point in a document in order for the user to interact with the document at that point e.g. positioning a cursor in front of a word in a line of text before carrying out an action such as typing text. In other examples, the symbol 24 could be content being dragged across the VDU 21, or some other moveable element such as an icon.

In FIG. 2 a user uses a conventional computer peripheral device, which is here represented in exemplary form as a mouse 23, to collect physical movement information from the user and move the symbol 24 from a first position 24a on the VDU 21 of the computer system 20 to a second position 24b. In alternative examples the physical movement information used to move the symbol could be collected by a trackball, touch sensitive pad, touchscreen, or other symbol controlling means.

In some examples the computer system 20 may be a personal computer (PC) or a laptop. In other examples the computer system 20 may be another device having a computing or IT capability, for example a tablet or a smart phone, or a consumer device having a visual display and sufficient processing capability, for example a music player or a television.

The applicant has conducted research to address the problems encountered when moving a symbol rendered in a GUI, and has established that an important aspect of how a user moves a symbol 24 presented in a GUI rendered on a VDU 21 is that a user generally looks at the region 25 at the second position 24b where they wish the symbol 24 to be moved to just before, and during the process of moving the cursor 24 from the first position 24a to the second position 24b.

Thus, before and during the process of moving the symbol 24, the user generally looks at a region 25 around the second position 24b which the symbol 24 is to be moved to. The user may move a symbol 24 to a position 24b presented in a GUI rendered on the VDU 21, for example at a particular or required position within a line of text without carrying out any action, such as a button click, e.g. clicking a mouse key or touch sensitive pad key, and/or keyboard key, i.e., the cursor 24 is simply positioned at a position 24b presented in a GUI rendered on the VDU 21 without selecting any content, and could for example be used simply to identify content presented in a GUI rendered on the VDU 21. During this process the user may be considered to be looking at the region 25 around the second position 24b where the symbol 24 is to be moved to and/or has been moved to. This region 25 where a user is looking during a movement of the cursor 24 without a button click is represented by a circle in FIG. 2.

However, in other examples the user may move the symbol 24 to a second position 24b and then identify or indicate that specific position 24b by initiating a button click on the mouse 23. This button click could be a release of the mouse button 26, for example if content was being dragged or moved to the position 24b, or a mouse click associated with positioning a cursor at a specific location 24b, for example within a line of text in readiness to typing text, or could be a mouse click associated with selecting content that is to be, for example, dragged across the GUI rendered on the VDU 21. This generally confirms that this position 24b within the GUI rendered on the VDU 21, where the symbol 24 is positioned when the mouse button click occurs, is the position of interest and is very likely to be the location where the user has been, or still is, looking. This region 29 where a user is looking during a movement of the cursor 24 with a button click is represented by a circle in FIG. 2.

Thus, the position 25 where the user is and/or was looking during a cursor 24 movement without a button click and the intended final position 24b of the symbol 24 are closely correlated, and the position 29 where the user is and/or was looking during a cursor 24 movement when a mouse button click occurs may be even more closely correlated. This is represented in FIG. 2 by the circle indicating the region 29 being smaller than the circle indicating the region 25.

However in some examples there may not be any increased correlation associated with the movement/positioning of a symbol in association with a mouse button click.

Figure 3:
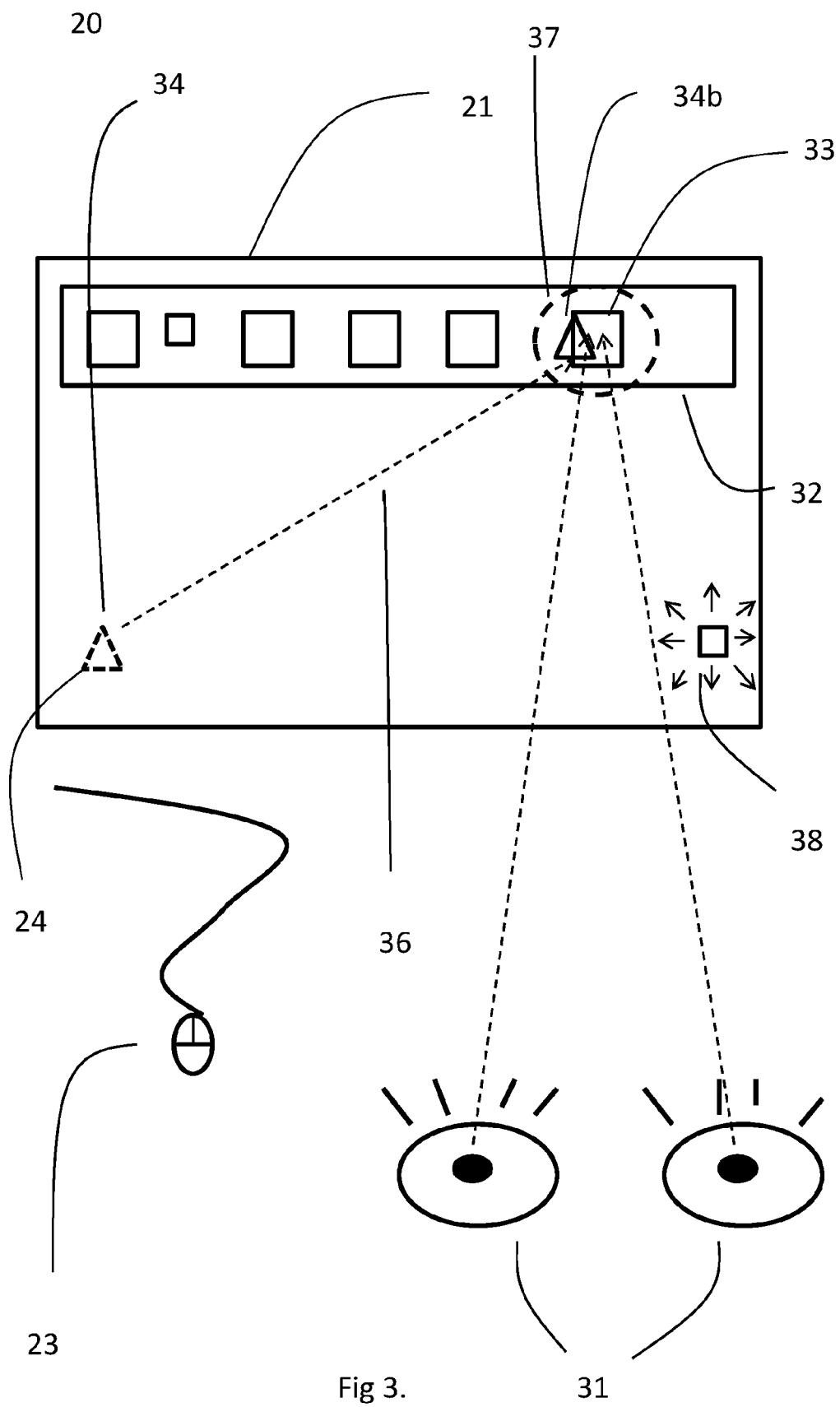
FIG. 3 shows a further schematic diagram of the cursor movement system of FIG. 2.

In FIG. 3 the computer system 20 discussed in relation to FIG. 2 is shown. Displayed content 32, such as a task bar or other content presented in a GUI rendered on the VDU 21 is shown. The position of the displayed content 32 is of course known to the computer system 20 which is displaying the displayed content 32. In FIG. 3 a user uses a conventional computer peripheral device, such as the mouse 23, to interact with a specific content item 33, within the displayed content 32. The specific content item 33, could for example be a text justification tab, where the displayed content 32 could be a taskbar, for example within a word processing environment. The user uses mouse 23 to move a symbol 24, such as a cursor, from a first position 34a to a second position 34b, and may make a button click on the mouse 23 to interact with the content 33 when the symbol 24 is in the second position 34b. Thus, during this process of interacting with content 33 the user, whose eyes 31 are graphically represented in FIG. 3, generally looks at the specific content 33. The region 37 where the user is looking while moving the symbol 24 is represented by a circle centred around the specific content 33 in FIG. 3. If the user, when interacting with the specific content 33, does not centre the symbol 24 on the specific content 33 when initiating, for example, a mouse button click, it may be assumed that the user was looking at the centre of the specific content 33, i.e. at the centre of region 37. This can be assumed because, even though the mouse button was clicked when the symbol 24 was not centred on the specific content 33, generally the user would have been looking at the centre of the target specific content 33. Thus, when the symbol 24 is positioned at a final location or second position 34b that is over, or partially over, specific content 33, but is not centred exactly on specific content 33 when a button click is made, it may be assumed that the user was looking at the centre of the specific content 33. In addition to the examples given above, the specific content 33 could be other content presented in a GUI rendered on the VDU 21, as would be appreciated by the person skilled in the art, for example the specific content 33 may be the start button, loudspeaker volume button, calendar button or other content.

It is to be noted that the time when a user is looking at a position within a GUI rendered on the VDU 21 and the time when the symbol 24 arrives at or near to that position need not be contemporaneous. For example, a user may look at an intended new position for the symbol 34 before beginning movement of the symbol 24, and as a result the user may already be looking at a new position for the symbol 24 when the symbol 24 arrives at the previous position. This may particularly be the case when a user is dragging content presented in a GUI rendered on the VDU 21 from one position to another, wherein the user may first look to where they want to move content, then drag content to that location, and before releasing the content at that position the user may already be looking at the next item of content to be dragged from one position presented in the GUI rendered in the VDU to another. However, as would be appreciated by the person skilled in the art there is still a correlation between where a user is, or has been, looking and the position of the symbol 24.

The applicant has made use of the correlation between where a user looks and the position of a symbol in the claimed apparatus and method described herein.

According to an aspect of the claimed apparatus and method, a gaze tracking system is used to determine visual gaze direction information from the user. Using this information the position within a GUI rendered on a VDU 21 where the user is looking can be determined. The gaze tracking system may use eye tracker technology, as is known in the art. Such technology includes: attachments to the eye and non-contact optical technologies for measuring eye motion, such as making use of light reflected from the eye. In examples where use is made of light reflections from the eye (or eyes), which can be analysed to extract eye (or eyes) motion and gaze direction, a light source or sources may be provided. Non-contact optical techniques and associated image processing may use any of the Pukinje images or other means, and may use techniques to locate the position of the pupil, the relative position of the light reflected from the user's eyes from the light source(s) compared to the centre of the pupil, an estimate of the distance between the eyes, an estimate of the distance between the light sources, an estimate of the position of the camera, an estimate of the position of the mid-point between light sources (for example if there are two) as part of the process of determining visual gaze direction information. Gaze tracking technology such as electric potential eye gaze detection means may also be used. The technologies listed above are only exemplary, and are not exhaustive.

Visual gaze direction information from the user may be based on or determined from one or both eyes.

Figure 4:
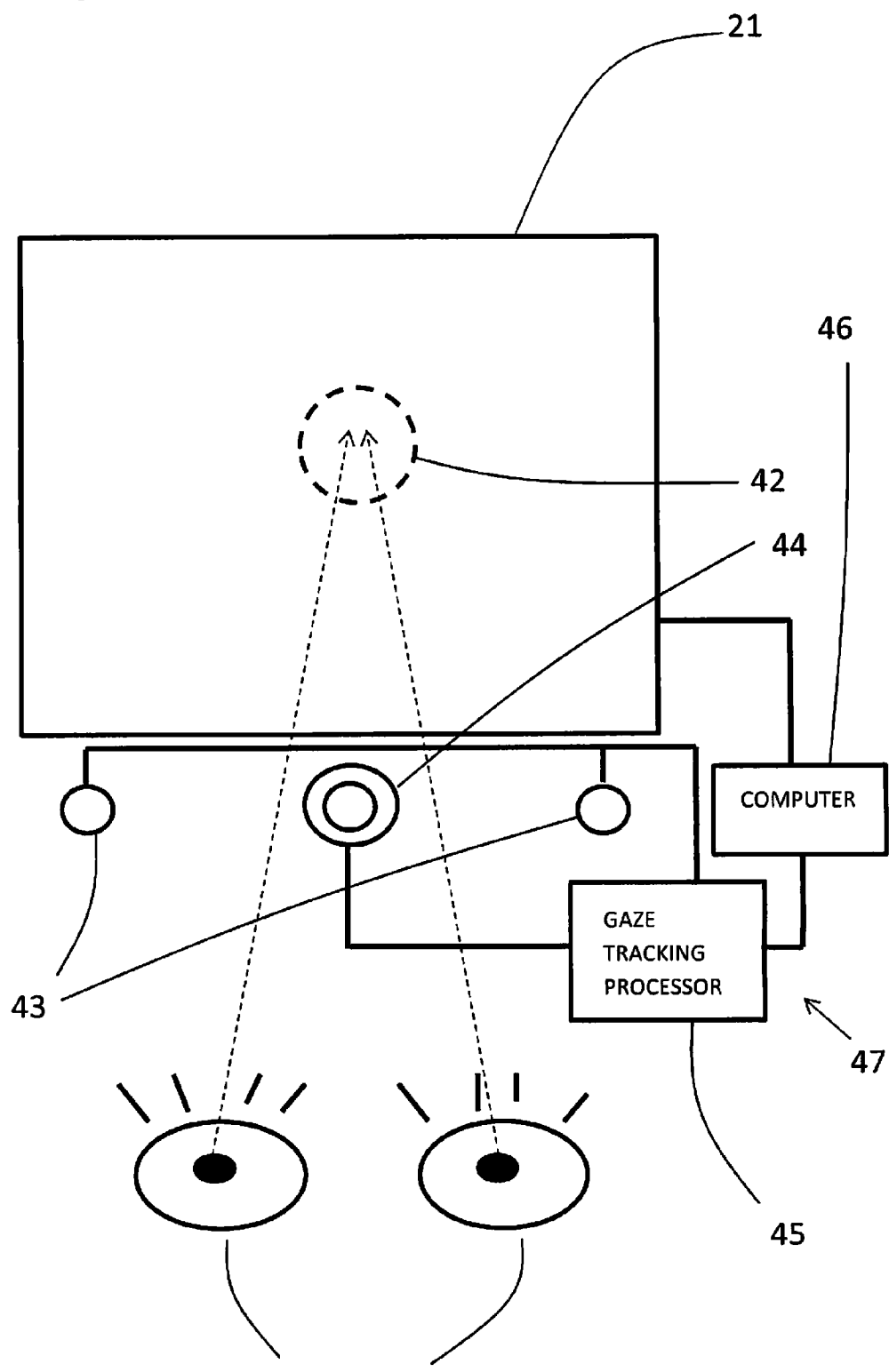
FIG. 4 shows a further schematic diagram of the cursor movement system of FIG. 2.

In FIG. 4 a schematic diagram of the computer system 20 discussed in relation to FIGS. 2 and 3 is shown, including an example of hardware used according to an aspect of the invention. The hardware comprises an exemplary gaze tracking system 47 used to determine visual gaze direction information from the user, as discussed above. In FIG. 4 a user, whose eyes 31 are graphically represented, is shown looking at a region 42 within a GUI rendered on the VDU 21. An exemplary gaze tracking system 47 is shown which comprises two light sources 43, a camera 44, and a gaze tracking processor 45 that is linked to the light sources 43 and camera 44; as discussed above the gaze tracking system 47 could be formed from any appropriate system known in the art with the example discussed here serving to indicate to the person skilled in the art how one example of a gaze tracking system 47 may be used according to an aspect of the claimed apparatus and method. The gaze tracking processor 45 controls the gaze tracking system (the light sources 43 and camera 44) and carries out any necessary image processing. The gaze tracking processor 45 is linked to a computer 46 that controls the content within the GUI rendered on the VDU 21, and performs other functions associated with a computer, such as control of peripheral devices including the mouse 23. The two light sources 43 and the camera 44 are preferably mounted below the VDU 21, with the two light sources 43 located on either side of the camera. The light sources 43 are preferably pulsed Near Infrared LED emitters. The camera 44 is preferably a USB camera.

However, other types of camera may be used. Light from the light sources 43 is arranged to illuminate the user's eyes 31 so that the light from the light sources 43 is reflected from the user's eyes 31. The camera 44 is positioned to look at the user and captures images of the user's eyes 31, preferably at a frame rate of 40-50 Hz or faster. The captured images of the user's eyes 31 preferably include the position of the eye pupil and the position of the light from the light sources 43 reflected in the user's eyes. Positioning of the light sources 43 at locations below the VDU 21 reduces problems associated with the user's upper eyelids masking the user's eyes 31. Eyelid 'droop' masking an eye can make determination of the position of the pupil and/or the position of the light reflected in the eye difficult. Accordingly, there may be problems if the camera and/or light sources are positioned at locations above the bottom of the VDU 21. The processor 45 processes the images of the eye or eyes to determine information that forms part of visual gaze direction information, and preferably operates at frequency of 40-200 Hz. As the processor 45 frequency increases, the system is able to converge on the necessary calibration faster, with the calibration process discussed below. However, it is not essential that the processor 45 operates at higher frequencies.

In general, gaze tracking systems need to be calibrated in order that the system can determine from information gathered by the gaze tracking system where a user is looking (i.e., to determine the gaze position or gaze direction of a user), for example to determine the position within a GUI rendered on a VDU 21 where a user is looking.

This requires the determination of parameters (here referred to as visual gaze direction information) associated with one or both eyes determined by an eye tracking system which may use image processing, and other aspects of the system which may, for example, include parameters such as the position and orientation of the user, the position of the camera used to acquire images of the user's eye or eyes, the position of light sources used to reflect light from the eyes if this technology is being used, and other parameters.

The visual gaze direction information is used to determine a user's gaze direction and/or the gaze position at which the user is looking. The gaze position may be associated, for example, with the position of a symbol presented in a GUI rendered on the VDU 21. This means that the visual gaze direction information may be used to determine where within a GUI rendered on the VDU a user is looking.

The location of the users gaze is not restricted to the VDU 21 and to content presented within a GUI rendered on the VDU 21. In some examples off-screen areas lying outside the VDU may be designated as off-screen controls, and the system can be arranged to respond to a user looking at these off-screen control areas. Such off-screen control areas can be used to add functionality to what is presented within a GUI rendered on the VDU 21 and therefore an aspect of the invention has this functionality which allows for and determines that the user is looking at such off-screen controls.

In some examples these off-screen control areas may be within a few centimeters of the edge of the VDU 21. In general, the further away from the edge of the VDU 21 that the user looks the more the accuracy of the system will be expected to decrease in terms of determining the spatial position of the user's gaze location. It practice it may be that the gaze tracking system start to fail when the gaze location is about a distance outside of the VDU 21 that is 25% of the largest dimension of the VDU 21, However this depends on the user's position and distance from the VDU 21, and the performance details of the specific gaze tracking system. Further, it is anticipated that future gaze tracking systems may have greater gaze location accuracy to enable gaze position to be determined at further distances from the VDU 21.

In some examples the system may also be used to assess if the user is not looking at material presented on the VDU. The user may for example look at an object, such as a telephone, that is positioned off to one side of the VDU 21 and the calibration may determine that the user is currently not looking at content presented within a GUI rendered on the VDU 21.

In order to allow a user's gaze direction and/or position to be determined from the visual gaze direction information it is generally necessary for the gaze tracking system to be calibrated. One method of calibration would be for a user to look at known locations within a GUI, for example in response to prompts presented on the GUI, so that the visual gaze direction information of the user can be associated with these known locations. The user gaze location determined by the gaze tracking system can be compared with these known locations, and if the determined and known locations are not the same, the gaze tracking system can be calibrated or corrected to bring the determined and known locations into agreement. However, this approach requires a user to actively participate in the calibration process, which may be undesirable.

According to an aspect of the invention, use is made of the information discussed in relation to FIG. 2, FIG. 3, and FIG. 4 from which the system can determine by implication where on a VDU 21 a user is or has been looking, i.e., at what content presented in a GUI rendered on the VDU the user is or has recently been looking based on the movements of a symbol and the locations of the symbol when mouse button pushes occur.

This means that according to the present apparatuses and methods, determination of a required or a desired calibration for the gaze tracking system can be conducted based on these implied, or deduced, user gaze locations in a way that may be transparent to the user; i.e., without the user having to take any dedicated calibration related actions, and possibly without the user necessarily being aware that calibration is being carried out.

According to the present apparatuses and methods, the user may use a mouse 23 (or other symbol controlling device such as a touch sensitive screen or pad, trackball, stylus or any other suitable means such as the keys on a keyboard) to position a symbol 24 at a particular position in a GUI rendered on a VDU 21. As discussed above, in some examples the symbol 24 could be a cursor, or content, or some other moveable element such as an icon. When the symbol 24 is at the particular position, this may be accompanied by a button click of the mouse/touch sensitive pad or button click of the keyboard or other user indication means as discussed above. The position or positions of the symbol 24 presented in a GUI rendered on the VDU 21 and the position where the user is and/or was looking may then be considered to be correlated, as discussed above, and this deduced or implied user gaze location information can then be compared to, or correlated with, visual gaze direction information gathered by the eye tracking apparatus, to determine whether any change in calibration is required, and if so the required or desirable calibration.

A calibration dataset can then be built up over time as a user uses a conventional mouse in a normal way, where through normal use calibration data across substantially the whole VDU 21 may be acquired.

In general, calibration needs to be performed for a variety of different positions across the VDU 21. In normal operation a large number of different positions for content presented on a GUI may be rendered on the VDU 21, and user interaction with an associated large number of different visual gaze direction information may be required in order to determine a full, necessary or final calibration of the system. The number of positions may be eight, or the number of positions may be less than eight, or the number of positions may be greater than eight.

The gaze tracking system includes eye tracking apparatus to determine information regarding the position/orientation and/or other parameters for one or both eyes related to gaze direction. These parameters may include the position of the pupil and/or the position of light source(s) reflections from the eye, and/or may determine other parameters such as the position and orientation of the user with respect to the VDU, where all this information is comprised within what is termed visual gaze direction information. This information may be determined for one or both eyes, as necessary. This visual gaze direction information may be compared to, or correlated with, the position or positions of the symbol 24 presented in a GUI rendered on the VDU 21 to form a calibration dataset. The calibration dataset can be used together with future visual gaze direction information to determine where within a GUI rendered on a VDU 21 a user is considered to be looking.

Visual gaze direction information from the user is acquired by the gaze tracking system at an appropriate update rate for the gaze tracking system to be able to determine a user's gaze direction, or gaze position, sufficiently accurately. In some examples, for a non-contact optical technique where images of the eyes may be acquired, images may be acquired at a rate of 40 Hz, or at a rate of up to and including 20 Hz, or could be at an update rate between 20 Hz and up to 40 Hz, or could be at an update rate up to and including 40 Hz or could be a rate higher than 40 Hz. This means that in these examples visual gaze direction information may be acquired at these update rates. In general, a useable update rate is anticipated to be specific to the particular configuration of the apparatus in any specific application, such as the size and resolution of the VDU 21 and the content presented on the VDU 21 and where the user is positioned relative to the VDU 21. For example, as the user is positioned further away from the VDU 21 the update rate that allows for adequate performance may need to be decreased. This is because the accuracy of the gaze tracking system is liable to become degraded as the user moves further away from the VDU 21, so that longer periods may be required to determine a gaze location. This applies both to the calibration apparatus and hybrid mouse apparatus, where these apparatus may be the same.

If insufficient calibration data exists over a region or regions of the VDU 21, for example a region or regions within a GUI rendered on the VDU 21 to which the user has not moved an symbol 24 to permit transparent calibration without dedicated user calibration action as discussed above, an appropriate dedicated calibration target may be presented upon the VDU 21 in order to allow the desired further calibration data to be gathered. The user may be required to position a symbol 24 over the dedicated calibration target and click a mouse button to remove the dedicated calibration target from the screen. In this way, a calibration data point may be acquired for the region or regions where the dedicated calibration target is displayed.

This is shown in FIG. 3, where specific content 38 may be presented as a dedicated calibration target within a GUI rendered on the VDU 21 at a region within the GUI rendered on the VDU 21 where insufficient calibration data exists, in order that the user looks at that position and moves the symbol 24 to that position so that calibration data about that point can be obtained.

The specific content 38 may for example be a flashing symbol such as a square, or non-flashing symbol presented in some other manner to attract the attention of the user, or may be presented in the GUI in other forms. The user uses the mouse 23 to move the symbol 24 to a position over the specific content 38. The symbol 24 is then positioned at the location of the specific content 38, and it may be assumed that the user is also looking at the position of the specific content 38 on the VDU 21 as part of that positioning process. The user may interact with the specific content 38 by initiating, for example, a mouse button click when the symbol 24 is positioned at the location of the specific content 38 presented in a GUI rendered on the VDU 21. This means that the user may be forced to look at specific content presented at a specific location which may be selected across any and all regions of the GUI rendered on the VDU 21 as required to gather calibration data.

Calibration is carried out across the acquired calibration data. Mapping between the parameters for one or both eyes determined by the eye tracking system (such as visual gaze direction information) and the associated positions within the GUI rendered on the VDU 21 of the symbol 24 may be carried out, from which any necessary change in calibration may be determined. This means that mapping includes correlating the position of the symbol 24 in the GUI rendered on the VDU 21 with visual gaze direction information from the user. Using the calibrated mapping the system can determine where within a GUI rendered on the VDU 21 a user is looking from visual gaze direction information acquired by or associated with eye tracking apparatus. The calibration may be carried out for both eyes together, or for each eye individually, thereby providing resilience within the calibration. For example, carrying out the calibration for each eye separately may allow the gaze direction or position to still be determined even if the system 'loses' one eye, so that visual gaze direction information can only be determined for one eye.

The necessary processing, mapping or correlating between the position or positions of symbols presented in a GUI rendered on the VDU 21 and the visual gaze direction information to determine any required or desired calibration changes could be carried out within the computer associated with manipulation of visual content in a GUI rendered on the VDU 21 (e.g. a PC, laptop or work station 46), or within a dedicated processor 45 as discussed in relation to the apparatus shown in FIG. 4, or could be carried out across both the PC 46 and dedicated processor 45 sharing the necessary processing tasks. The mapping may include linear or non-linear regression, or other suitable mapping techniques known in the art. In some examples this means that the mapping to determine a user's gaze position based on visual gaze direction information is based upon measurements made by the system.

In acquiring calibration data, the acquisition of invalid data should be minimised. To enable this, calibration data are not used if there is a reason to doubt the validity of the data.

To understand this part of the calibration process, it is worthwhile briefly to discuss how the eye works. A person's eyes are continually in movement even when they are looking at a fixed object or location. Rapid and/or significant eye movement may occur when looking from one object or location of interest to another. However, whilst looking at an object, although the eye is continually in movement, the gaze direction will be centred on the object; the person's gaze may be considered to linger on the object for a short time. Visual gaze direction information may be used, through appropriate processing, to determine the eye movement of one or both of the user's eyes. The appropriate processing to determine eye movement forms part of known gaze tracking or eye tracking technology.

In the present invention, rapid and/or significant eye movement includes eye movement having characteristics different to that associated with a user looking at a stationary or slowly moving, or piecewise continuous moving, object, symbol or content presented in a GUI rendered on the VDU 21, however as discussed below, what is regarded as a rapid and/or significant eye movement may depend on where and how a user is looking. For example, this may mean that during calibration the user has to move their eyes significantly or rapidly, for example when looking at a new position in the GUI rendered on the VDU 21, a position where the symbol is to be moved, or has just been moved, or is the process of being moved, in order to obtain a new calibration point. Eye movement may be classed as being significant eye movement when the eye movement exceeds a threshold movement distance or velocity, or related thresholds of both parameters, and such significant eye movement may be required before a new calibration point can be acquired. This is to ensure that calibration points are not incorrectly acquired, for example when a user is reading a line of text, or otherwise when their eyes may be drifting and not moving rapidly and/or significantly to a new calibration point associated with the symbol position.

Use is made of this knowledge when acquiring calibration data, in order to enable the calibration system to reject invalid calibration data.

The concept of significant eye movement can be most easily defined, visualised and understood with reference to movement of the determined gaze position on the GUI rendered on the VDU. However, such movement of the determined gaze position corresponds to actual movement of the eyes themselves, so significant eye movement can alternatively be defined, with reference to movement of the eyes.

To ensure that calibration data are only acquired for data associated with the position of a symbol presented in the GUI rendered on the VDU 21, calibration data is acquired only in response to a required rapid and/or significant eye movement associated with a change in gaze direction when the user is looking at a particular position in the GUI rendered on the VDU 21 associated with the symbol 24. In practice, such a change in gaze direction will be followed by at least a required short period where the user's gaze lingers at the new position, this lingering corresponding to limited eye movement. This may then be followed by a further required rapid and/or significant eye movement associated with the user looking at another position in the GUI rendered on the VDU 21.

Accordingly, in some examples, calibration data acquired in predetermined time periods before and after a significant eye movement are not used because the user's eyes are expected to be moving during these predetermined time periods. These predetermined time periods may be short. For a gaze tracking system operating at an update frame rate, predetermined numbers of frames before and after rapid and/or significant eye movement may be ignored. The number of frames not used in calibration before rapid and/or significant eye movement may equal the number of frames not used in calibration after rapid and/or significant eye movement. The number of frames ignored may be 4, or may for example lie between a value of 1 and 10. Ignoring a number of frames before and after a rapid and/or significant eye movement may be needed in relation to a camera buffer. In a preferred example the number of frames that are ignored may be as small as possible. This means that the short time period before and after a significant eye movement from which calibration data is not used may be equal to the reciprocal of the frame update rate multiplied by the number of frames from which calibration data is not used.

In some examples all gathered calibration data may be used, and the approach discussed above of ignoring data for a period of time or number of frames may not be followed.

In some examples, if a user's gaze drifts significantly in position after a rapid or significant eye movement, that data point is ignored. This may be determined by comparing the distance of any shifts in position to a predetermined threshold for a predetermined time after a rapid and significant eye movement, and ignoring the rapid and significant eye movement if the eye movement threshold is exceeded during this time.

Accordingly, in such examples, calibration data is not acquired after a significant and/or rapid eye movement if the user's eye movement is not then relatively static for a short period of time, which would indicate that the user is looking at a particular position in the GUI rendered on the VDU 21 for that short period in time. This short period, may be consistent with 1 to 10 frames of the system operating at an update rate. For example this may be less than 0.1 seconds for a system operating at an update rate of 40-50 Hz. In some examples the time delay may be substantially less than this time or greater than this time.

In general, during calibration visual gaze direction information or data are not averaged, with valid data being used to form the calibration from each frame or update event. In some examples all possible data are used in the calibration.

In some examples all valid data are used to perform calibration.

In some examples because, as is explained above, a person's eye is always in movement even when looking at a fixed position such as the symbol 24, visual gaze direction information or data are averaged over a short time period equivalent to a number of frames (or update events) to obtain visual gaze direction information or data to be used in calibration. The number of frames may be 4 or may for example lie or between 2 to 10. In some examples the number of frames may however be greater than this number. The short time period over which visual gaze direction information are averaged is then equal to the reciprocal of the frame update rate multiplied by the number of frames over which the data are averaged.

In some examples, after a calibration datum is acquired, further calibration data is not acquired until there is a further significant eye movement; i.e., the user looks at a new position in the GUI rendered on the VDU 21 associated with the symbol 24.

To summarise the above:

If there is a significant eye movement, such as a rapid and/or sudden eye movement and/or a long distance eye movement, then this is a cue that the gaze position may have moved to a new position, and it may be possible to acquire a new calibration point.

If the eye is relatively static, and if this was preceded by a significant eye movement, then this is a cue that this is valid data and should be consider for use in calibration. If the gaze position is to be used in calibration then the system must know where the user is looking, either by inference based upon a mouse click or some other action, or based upon a user interaction with a dedicated calibration point, as discussed above.

If the eye is moving and/or drifting, indicating that the gaze position is moving, but this movement does not match the criteria of a significant eye movement, then this is not necessarily a cue that the gaze has moved to a new position. This movement could be caused by errors or noise, or by the user reading a line of text, or the like. In this case a calibration point is not anticipated to be collected.

If the eye movement is erratic, indicating that the eye is moving but the movement is not consistent and/or large and/or significant and/or rapid and/or sudden and does not match the criteria of a significant eye movement this could be minor deliberate eye movements or could be within the bounds of error in the system and/or caused by errors or noise.

In some examples a significant eye movement during calibration may be defined as an eye movement associated with movement of the eye consistent with looking at positions on the screen separated by a significant dimension of the screen. In some examples a significant dimension of the screen may be 5%, 10%, 25%, 30%, 35%, of the dimension of the screen.

In other examples a significant dimension of the screen may be more or less than this. The apparatus may determine a distribution of eye movements to determine eye movements consistent with movement across a dimension of the screen, and from this determine a significant eye movement for calibration purposes.

In some examples the criteria for identifying a significant eye movement may be customisable, but should be significant in comparison to expected variation in the accuracy of the system, $\sigma$. In some examples a significant eye movement should be greater than 4 $\sigma$. In some examples a significant eye movement may be less than $\sigma$, 1 $\sigma$, 2 $\sigma$, 3 $\sigma$ or 4 $\sigma$.

In some examples the criteria for identifying a significant eye movement is configured or set by the user, in other examples the criteria for identifying a significant eye movement are learnt by the hybrid mouse apparatus. In other examples the criteria are adapted over time. In other examples the criteria for identifying a significant eye movement are dependent on the application. For example, in an application when symbols are very closely spaced on the GUI presented on the VDU 21 the criteria for identifying significant eye movement may be less than in another application where icons are more widely separated on the GUI presented on the VDU 21.

In some examples the criteria or threshold for identifying a significant eye movement leading to the symbol 24 being positioned on the basis of a user's gaze position may be greater than the subsequent threshold for a significant eye movement. This enables the Hybrid Mouse system to effect a movement of the symbol 24 and then, if required, to effect for example a corrective movement of the symbol based on the user's gaze position. A corrective movement of the symbol 24 may be required because the symbol 24 was not positioned exactly where the user required, requiring a further movement of the symbol 24, which could be effected through visual gaze direction information and/or physical movement information. This means that under the Hybrid Mouse functionality a symbol 24 may be positioned based on the gaze direction of the user, with gaze direction being used to effect large and small movements of the symbol, and may be positioned based on the gaze direction of the user in combination with the user moving a mouse 23 to move the symbol 24.

Within the calibration process greater weight may be assigned to a calibration data point associated with a positive button click action, compared to a calibration data point acquired when the user does not affect such a positive button click action. A weighting factor from 1-2, or between 2-5, or between 5-10 may be applied to such a positive calibration data point compared to other calibration data points.

In some examples the gaze tracking system has only one light source, or more than two light sources. The light sources 43, in some examples, emit light in a wavelength range other than the near infrared such as in the visible or mid infrared range. The light sources 43, in some examples, may be light sources other than LED emitters, for example incandescent light sources or eye safe laser light sources. The light sources 43, in some examples, may be mounted at positions other than at the base of the VDU 21, for example at the sides or at the top of the VDU 21. In some examples two light sources 43 are mounted below the VDU 21 and two light sources 43 are mounted either side of the VDU 21. The light sources 43, in some examples, are operated in a continuous mode and not pulsed.

In some examples the camera 44 may be a camera other than a USB camera, for example GiGe, cameralink/firewire, or a high definition camera with HDMI cabling or a variety of other camera formats connected to the processor 45. Furthermore, in some examples more than one camera 44 may be used. In some examples the frame rate of the camera 44 is less than 40-50 Hz, and may in some examples be between 20 Hz and 40-50 Hz.

In some examples the processor 45 operates at a frequency below 40 Hz, or above a frequency of 200 Hz.

In some examples radiation from only one light source 43 is reflected in the user's eyes 31. In some examples, radiation from more than one of the light sources 43 is reflected in only one of the user's eyes 31.

In some examples the position of the pupil of only one of the user's eyes 31 is determined. In some examples, the position of the pupils of the user's eyes 31 is not required to be determined.

In some examples the position of the pupil of an eye may be determined using analysis based on a circular Hough transform, however there are a variety of alternative ways to determine the centre of the pupil. The analysis based on a circular Hough transform is used to determine the radius of the pupil and its position in the image, i.e. its x, y coordinates.

In some examples a variant on the standard circular Hough transform which makes use of edge strength for improved robustness is used. This also uses a priori knowledge from previous analyses of the data to optimise likely parameters, such as the position and radius of the pupil of the user's eyes 31, and to constrain the parameter space over which the Hough transform is calculated. Both the position and radius are determined to sub-pixel accuracy. This allows the analyses to run sufficiently fast on a standard fast PC system.

In some examples, such as where the user is wearing glasses, circumstances may impact upon the apparent positions of the illuminators/pupil and may result in very significant reflections which can decoy the analyses or which may partially or totally obscure the reflections of the light sources 43 in the eye or parts of the eye itself. If the user is wearing glasses then this can result in reflections, for example from the illuminators or light from other devices or light from windows or light from other background radiation sources, that may partly or completely obscure the true reflections of the light sources 43 in the user's eye or eyes 31. These issues all add to the complexity of the analyses and make it more difficult to create a robust system. In some examples this problem can be mitigated by swapping to an alternative set of light sources. This can be done pro-actively when the system believes that movements are such that the reflections are likely to cause a problem soon, or re-actively when the system has lost the true illuminator reflections, for example because of reflections on the glasses. This applies to both the calibration aspects of the Hybrid Mouse, and to the operational aspects of the Hybrid Mouse.

In some examples the position of the light sources 43 is determined using matched filters, and may use a double gated operator convolved with the image of the user's eye or eyes 31. The resultant image is then thresholded to leave a small number of objects which are considered to be potential light sources 43. These objects are then analysed and those that do not exhibit characteristics that light sources 43 reflected in the user's eyes should have are rejected. The criteria that are used to reject false detections include size, aspect ratio and density. Additional constraints may be included when a pair of light sources 43 are used. These additional constraints may include the relative position of the light sources 43, eg. x and y separation. Constraints on these characteristics can be determined from a physical analysis of the Hybrid Mouse system and from analyses of previous images. For instance, constraints can be placed on the relationship between the light sources 43 and the centre of the pupil using information derived from the analyses of previous images. The centre of the light sources 43 may be determined to sub-pixel accuracy.

In some examples during a start-up or boot phase, or where the system has been running but the user has only just moved into sensing range of the Hybrid Mouse system, the system may have no true idea of where the user's eyes 31 are or the position of the light sources 43 reflected in the eyes. In such a situation the Hybrid Mouse system may be running on a full frame image in order to initially locate the user's eyes 31 and consequently the frame rate may be relatively slow. In such a boot phase the Hybrid Mouse system searches for candidate light source 43 reflections in the user's eyes 31 over the whole image. In some examples various thresholds are adapted so that the system gets between 5 and 20 candidate pairs of reflections (these can be varied as necessary). The Hybrid Mouse system then finds the user's eyes 31 and pupils by finding objects in the image that appear to be pupils, which have an appropriate radius for a pupil consistent with and within an appropriate distance of the light sources 43 and where the pupils are at an appropriate distance from each other, and checks that the relationship between the light sources 43 and the pupil centres are consistent and appropriate for both of the user's eyes 31. Once this has been achieved then the Hybrid Mouse system moves to a 'normal' phase using information from this analysis to provide a priori information for the normal phase. The boot phase will also determine an appropriate size and position for a 'region of interest' which will contain both of the user's eyes with sufficient spare space around the image field of the or each eye or eyes to enable the user to move significantly without the user's eyes 31 going outside this region of interest. In the Hybrid Mouse system this enables the image acquisition frame rate to be increased. The frame rate then may be increased to greater than 40-50 hz.

In some examples during the normal phase processing, the Hybrid Mouse system uses a series of 'regions of interest' (ROI) to control what processing is done and over what part of the image. The detailed process ROI is a small window centred on where the Hybrid Mouse system calculates a user's eye to be. Within this window it attempts to find candidate pairs of light sources 43 and the centre of the pupil or the user's eye or eyes 31. Provided that these can be found satisfactorily then the positions of these are used to set the position of this ROI for the analyses in the subsequent image. If the pupils and light sources (which can be a single light source) cannot be jointly found then the size of this ROI is increased up to some maximum size in small steps. Similarly, if they can be found then the size is reduced down to some minimum size in small steps. If the system has been unable to find the light sources 43 and pupil in one eye for a number of frames then it will use the analyses from the other eye, coupled with parameters determined over time (such as a time weighted average displacement between eyes) to determine where the processing should be applied to find the 'missing' eye and its parameters. If both of the user's eyes cannot be found for a large number of frames, then the system may move to a re-acquisition phase.

In some examples in a re-acquisition phase the Hybrid Mouse system uses the same type of processing that was applied in the boot phase but within the capture window. Additional a priori information may also be used which has been derived over time, such as a time weighted estimate of the distance between the user's eyes 31; the likely displacement between the light sources 43 etc. If the light sources 43 and pupils for both of the user's eyes cannot be found for further large number (100's) of frames then the system may revert to the 'boot phase'. System derived parameters (such as expected distance between the eyes) may be reset if appropriate.

In some examples the gaze tracking system, comprising light sources 43, camera 44, and gaze tracking processor 45 may be wirelessly connected to the computer 46.

In some examples, the computer 46 may perform the function of the gaze tracking processor 45.

Once calibration has been performed, visual gaze direction information gathered by a gaze tracking system may be used to position a symbol 24, such as a mouse cursor, at the location or close to the location in a GUI rendered on a VDU 21 where a user requires it to be positioned, i.e., close to or at a desired position. In some examples the desired position may be a significant position, such as a toolbar button or start button in a GUI presented on the VDU 21.

In the Hybrid Mouse functionality according to an aspect of the apparatus and method the symbol 24 can be positioned using both visual gaze direction information from the user, and using a conventional mouse 23 to effect movement of the symbol 24 in a GUI rendered on a VDU 21, where the Hybrid Mouse selectively determines whether the symbol 24 is to be positioned on the basis of visual gaze direction information from the user or on the basis of data collected from a conventional mouse 23 at any specific time.

Use of the mouse 23 to move the symbol 24 may constitute small corrective movements of the position of the symbol 24, after the symbol 24 has been positioned on the basis of visual gaze direction information from the user, or the user may wish to use the conventional mouse 23 to effect large changes in the location of the symbol 24 in a GUI rendered on a VDU 21. When the user moves the mouse 23, or other symbol control means such as a touch pad or joystick, dynamic data are collected from the mouse 23 or other peripheral device that indicates that the user wishes to move the symbol 24 in a GUI rendered on a VDU 21 using the conventional mouse 23, and control of the position of the symbol 24 is then determined from the dynamic data collected by the conventional mouse 23, and not from visual gaze direction information gathered by a gaze tracking system.

Although data is being acquired from the conventional mouse 23 all the time, even when the mouse 23 is stationary, here it is considered that data in terms of physical movement information from the user is being collected from the mouse 23, or touch pad or joystick or other peripheral device, when the user is moving the mouse 23, or joystick or moving their finger on a touch pad, such that dynamic or changing data are being collected in the form of physical movement information indicating that the position of the symbol 24 should be changed.

This means that when the user wants to move the symbol 24 in a GUI rendered on a VDU 21 using the conventional mouse 23, the conventional mouse 23 can be used to move the symbol 24, and when the user wants to move the symbol 24 on the basis of where they are looking in a GUI rendered on a VDU 21 the symbol 24 can be moved on the basis of visual gaze direction information from the user.

Once calibration has been performed, allowing for the Hybrid Mouse functionality to be used to position an symbol 24 in a GUI rendered on a VDU 21 by a combination of both visual gaze direction information and dynamic data collected by a conventional mouse 23 the calibration is here termed as the 'necessary' calibration, that is, the calibration necessary for proper functioning of the hybrid mouse.

However, during the calibration process calibration data is acquired to build up the necessary calibration, and during the process of acquiring the calibration data intermediate calibrations can be used to help select what data should be used in gathering the calibration data to build the necessary calibration. For example, when a user is looking at an entirely different position in a GUI rendered on a VDU 21 to the position of the symbol 24 when a mouse button click is effected, then the acquired datum should ideally not be used in building the necessary calibration. Intermediate calibrations can be used to help eliminate the incorporation of such acquired outlier data into the necessary calibration as discussed below.

In an example of a calibration process, a first intermediate calibration is determined with all available data which is considered valid. This data is then passed back through the calibration process to determine where the user 'would have been looking' based on the intermediate calibration. If this is consistent and reasonably close to where the system believes that they are looking, for example where the user effects a button click with a conventional mouse and the user is assumed to be looking at the position of the symbol 24 at that time and the determined gaze position is reasonably close to the symbol 24, the data is accepted into a second data set of further calibration data, otherwise it is rejected. The calibration process is repeated using the augmented second data set to form a second intermediate calibration, leading to acceptance or rejection of the second data set of further calibration data. This process can be repeated again as many times as required until a necessary calibration is determined.

In a further example of the calibration process, once a number of calibration data have been acquired where the resultant calibration would not be accurate enough or stable enough to constitute the necessary calibration, an intermediate calibration may be determined that can be used to determine if subsequent calibration data should or should not be used in constructing the necessary calibration.

A first intermediate calibration is then determined from acquired calibration data. This first intermediate calibration can be used to determine the user's gaze direction from visual gaze direction information, with the resultant gaze position accepted as probably not being accurate enough for Hybrid Mouse functionality but being accurate enough to assess the reliability of a subsequent acquired calibration datum and determine if this should be used in the construction of the necessary calibration.

This means that the first intermediate calibration can be used to determine if a calibration point or datum acquired subsequent to the first calibration is valid or invalid and may not be considered in the formation of a necessary calibration. Determination of whether a subsequent acquired calibration datum is valid is conducted through the first intermediate calibration being used to determine where a user is looking within a GUI rendered on the VDU 21 from visual gaze direction information acquired subsequent to the determination of the first intermediate calibration.

If this position where a user has been determined to be looking within a GUI rendered on the VDU 21 using the first intermediate calibration does not correlate with the position of the symbol 24 in the GUI rendered on the VDU 21, then the acquired calibration datum is deleted and does not form part of the necessary calibration. This is because for that acquired calibration datum it appears that the user was not looking at the position of the symbol 24 in the GUI rendered on the VDU 21 during the acquisition of the calibration datum. The criterion used to determine if there is no correlation can be that the determined gaze position and the position of the symbol 24 in the GUI rendered on the VDU 21 are separated by a predetermined screen distance on the VDU 21. In some examples this distance may be 5 cm. In other examples, different distances or criteria may be used.

However, if the determined position using the first intermediate calibration does correlate with the position of the symbol 24 in the GUI rendered on the VDU 21, the calibration datum is used to form a second intermediate calibration. This second intermediate calibration may or may not be accurate enough to be used as the necessary calibration. If the second intermediate calibration is not useable as the necessary calibration then the second intermediate calibration can similarly be used in the manner described above with respect to the first intermediate calibration to determine if subsequent acquired calibration data are invalid or valid, and from which a third intermediate calibration can be determined and then a fourth, fifth, or however many iterations are required before sufficient calibration data for the necessary calibration is obtained.

Thus, upon acquisition of each valid position datum a new calibration is determined, with this calibration in general being more accurate than the previous calibration in terms of determining a user's gaze direction from visual gaze direction information. One reason that the calibration becomes more accurate as more calibration data are acquired is that the effect of random 'noise' that reduces the accuracy of the calibration is offset with more calibration data. Such random noise could for example arise where the user was not looking exactly at the symbol 24 in the GUI rendered on the VDU 21 when the calibration datum was acquired. For example, the user may have been looking slightly off to one side of the position of the symbol. However, during acquisition of the next calibration datum the user may be looking slightly off to the other side of the symbol, and during the next acquisition of a calibration datum they may be looking below the symbol 24 in the GUI rendered on the VDU 21. Other noise may be due to the fact that the user's eyes will be in constant motion even when looking at a fixed object and other noise such as vibration of the camera etc. For random noise, then the accuracy of the calibration may in simple terms be considered to vary as the square root of the number of acquired calibration data used to form a calibration. This means that a calibration formed form 100 calibration data may be expected to be approximately three times more accurate than a calibration formed from 10 calibration data.

Thus calibration may be efficiently determined using this process of using an existing calibration in determining if a calibration datum or data set is valid or not and therefore whether that calibration datum or data set should be used in the process of determining a necessary calibration. It is clear that this process could be continually used to produce an ever more accurate and robust calibration. This means that even when the user is not aware that calibration is being undertaken, data considered to be valid (and with a reasonable gaze mapping position) could be continuously being added to the calibration data set and being used to refine the calibration. Therefore, even when the user is operating the system in the Hybrid Mouse mode discussed below the necessary calibration could be continuously improved or refined.

In some examples calibration data may only be acquired when visual gaze direction information are available for both eyes.

In some examples, calibration data may be acquired when visual gaze direction information are available for each eye individually.

In some examples calibration data is may be collected for an individual eye only if there is valid visual gaze direction information or data for both eyes.

In some examples each eye, and both eyes, are treated independently and this results in 3 calibrations, one for each eye individually and one for both eyes together. However, in some examples this process could be carried out totally independently for the 3 cases. In such cases this would mean that when the user's gaze position is being determined, then this is performed using all 3 calibrations, which means that even if there is only valid visual gaze direction information or data for one eye the system will still give a valid gaze position.

In some examples, calibration data may be lead to a more robust or refined calibration if the user's head moves in relation to the eye tracking apparatus in all directions during calibrations, including towards and away from the eye tracking apparatus.

In some examples, calibration data may not be acquired when the user's determined gaze position within a GUI rendered on a VDU 21 and the position of the symbol 24 in the GUI rendered on the VDU are at positions within the GUI rendered on the VDU 21 separated by a significant dimension of the screen. A significant dimension of the screen may be 5%, 10%, 25%, 30%, 35%, or more or less of the dimension of the screen.

In some examples, calibration data may not be acquired when the user's determined gaze position within a GUI rendered on a VDU 21 and the position of the symbol 24 in the GUI rendered on the VDU are at positions within the GUI rendered on the VDU 21 separated by greater than 4 $\sigma$. In some examples the separation may be less than $\sigma$, 1 $\sigma$, 2 $\sigma$, 3 $\sigma$ or 4 $\sigma$.

In some examples, calibration may allow for determination of the position in a GUI rendered on a VDU 21 where a user is looking from visual gaze direction information relating to both eyes.

In some examples, calibration may allow for determination of the position in a GUI rendered on a VDU 21 where a user is looking from visual gaze direction information relating to each eye individually.

In summary:

In the 'interactive calibration', the system puts a symbol or symbols at a series of known positions in the GUI presented on the VDU 21, which the user then looks at. The process then determines where the user is looking and hence can conduct the calibration.

In the 'passive' calibration, the system is monitoring where it believes the user is looking, or where they should be looking. When there is a high confidence that where the user is looking matches with where the system thinks that they are looking, then this information is used to build up data for calibration. In this case, it will be assumed that the user is generally looking at the cursor when they carry out a button 'click'. Detailed analyses will be done to validate this assumption before using the data for calibration. The system might also generate a symbol or icon to attract the user's gaze and hence build up additional data for calibration. Again, detailed validation would need to be done.

The 'passive' approach can be used to improve calibration after the interactive calibration has been done, or the passive approach can be used on its own.

Once calibration has been performed according to an aspect of the apparatus, visual gaze direction information gathered by a gaze tracking system may be used to position a symbol 24, such as a mouse cursor, at the location or close to the location in a GUI rendered on a VDU 21 where a user requires it to be positioned, i.e., close to or at a desired position. This positioning may involve movement of the symbol 24 from a different part of the GUI rendered on the VDU 21, or even from a GUI rendered across more than one VDU 21 if the user is using more than one VDU 21. This movement of the symbol 24 may be effected using visual gaze direction information in a very short time. In one example this time may be less than 0.1 s. In other examples the time may be less than this or greater than this.

As discussed above in the discussion associated with FIG. 1, if a conventional mouse was required to effect this movement, a number of separate conventional mouse movements may be required to move the symbol, such as a cursor, a large distance across the GUI rendered on a VDU, moving the mouse back and forth across a mouse mat—dragging and then lifting it. However, according to the present approach this symbol movement, which could be a large movement, is based on where the user is looking (their gaze direction or gaze position within the GUI rendered on the VDU 21), this being the region where the symbol 24 is required to be positioned.

Further, according to the present approach the movement of a symbol such as a cursor to the gaze position of a user may simplify the recovery of a lost cursor, where a user has lost track of where the cursor is currently located. This is because the present approach will move the cursor to the user gaze position automatically without the user having to identify the current position of the cursor.

The applicant's research has determined that symbol control using visual gaze direction information alone is problematic. There are several reasons for this, which were discussed in passing within the above section describing calibration of the apparatus; but are here discussed again. One reason is that gaze tracking may position a symbol where a user requires it to be positioned with sufficient accuracy. The calibration discussed above may enable determination of a predicted user's gaze position within a GUI rendered on the VDU 21 that may be close to a desired position at which the user is directing their gaze. In one example this may be of the order of 0.5-1 cm distant from the 'real' gaze position within a GUI rendered on the VDU 21 at which the user is directing their gaze. A second reason is that, as discussed above, a person's eye is continuously in motion even when the user perception is that they are looking fixedly at an object or location. This means that when the user is looking fixedly at a stationary object in a GUI rendered on the VDU 21, the determined gaze position will exhibit a variance that may be of the order of 0.1-0.5 cm due to these unconscious and involuntary eye movements; the user would not want the cursor to follow these movements. Another reason is that the human eye is inherently an input device and not an output/control device, and use of the eye to continuously control the position of a symbol can become extremely tiring.

In some examples, determination of a predicted user's gaze position within a GUI rendered on the VDU 21 may be of the order of 0.5-2 cm distant from the 'real' gaze position within a GUI rendered on the VDU 21 at which the user is directing their gaze. In some examples the positional variance may be of the order of 0.1-1 cm. In some examples the positional accuracy may be better than 0.5 cm or greater than 2 cm and the variance may be better than 0.1 cm or greater than 1 cm.

To address these problems the applicant has developed a hybrid mouse system according to an aspect of the apparatus. The hybrid mouse system allows for control of the position of an symbol 24 within a GUI rendered on a VDU 21 using both visual gaze direction information and information from use of a mouse 23 being used in a conventional or traditional way—i.e., being dragged across a mouse mat.

The hybrid mouse apparatus makes the decision as to whether the symbol 24, is to be moved on the basis of gaze direction or on the basis of physical movement information provided by the user from the mouse 23; this decision making process is based on the user's predetermined criteria.

As discussed previously, the mouse 23 is used to collect physical movement information from the user.

In other examples the computer peripheral device, which is here discussed in exemplary form as a mouse 23 could be other symbol moving means known in the art, such as a touch sensitive pad, a trackball a keyboard or other symbol controlling means.

The hybrid mouse apparatus is described below.

Once any necessary calibration has been performed, as discussed above, the system may indicate to the user that control of the position of an symbol or symbols presented in a GUI rendered on a VDU 21 could be by means of the hybrid mouse system or the user could continue to use a conventional mouse alone to control the position of the cursor 24 within a GUI rendered on the VDU 21. The system or apparatus could for example present a message within the GUI rendered on the VDU 21 to the user indicating that the Hybrid Mouse was ready for use.

Figure 5:
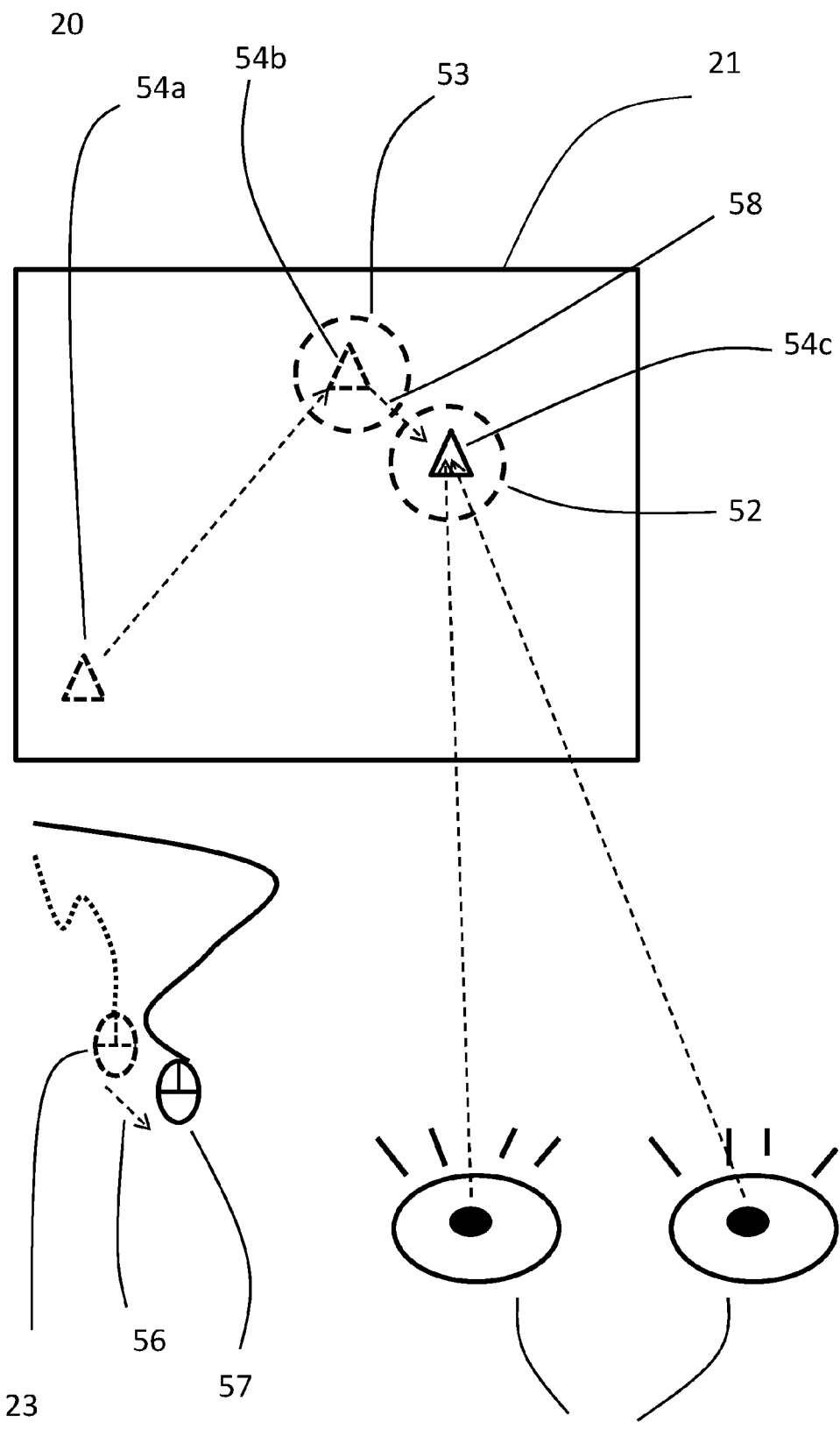
FIG. 5 shows a further schematic diagram of the cursor movement system of FIG. 2.

FIG. 5 shows a schematic diagram of the computer system 20 as discussed in relation to FIG. 2, FIG. 3, and FIG. 4 incorporating an aspect of the claimed apparatus. In FIG. 5 a user wishes to move a symbol 24 from a first position 54*a* to a final position 54*c* within a GUI rendered on the VDU 21. To achieve this, the user looks at the region 52 around the final position 54*c* where they wish the symbol 24 to be positioned. The region 52 is represented by a circle in FIG. 5.

As discussed above, visual gaze direction information is used by a gaze tracking system to determine a gaze position within the GUI rendered on the VDU 21, i.e., determine where the user is considered to be looking within the GUI rendered on the VDU 21. To ensure that casual glances from the user, or other non-significant gaze direction movements, do not lead to an unwanted symbol movement, the apparatus requires that a significant eye movement, as defined above, occurs with the gaze position or direction then lingering at a new position associated with the gaze position or direction for at least a predetermined time. Furthermore, the new gaze position should be at a significantly different position to the last determined gaze position or direction. The magnitude of a significantly different position step may vary across the GUI presented on the VDU 21. For example, on the GUI presented on the VDU 21 where there are no or few symbols the magnitude of a significantly different position step may be greater than that at a region where there is a symbol or a number of symbols. The magnitude of a significantly different position step may be user and/or application dependent. The magnitude of a significantly different position step may depend on where and how a user is looking, for example the significantly different position step may depend on how long a user's gaze lingers at a position or symbol, or area of symbols, even if not preceded by a significant eye movement.

However, as discussed above, due to inaccuracies in eye tracking systems combined with a person's eye or eyes being in continuous movement, the determined gaze position within the GUI rendered on the VDU 21 may not be exactly where the user requires the symbol 24 to be positioned; the determined gaze position may not be centred exactly on where the user was looking. The determined gaze position 53 is represented by a circle in FIG. 5.

The separation between the region where the symbol 24 is to be moved 52, centred around the required location 54c, and the determined gaze position 53 is shown in FIG. 5 as being quite widely separated; this is shown for reasons of clarity and the separation may be less than that represented in FIG. 5.

In the situation represented in FIG. 5, the symbol 24 is originally at a first position 54a. The symbol 24 is then moved on the basis of the visual gaze direction information from the user and is repositioned at a second position 54b, centred on the determined gaze position 53.

The hybrid mouse functionality enables the user to then use the conventional mouse 23 to make a small corrective movement 58 to the position of the symbol 24 within the GUI rendered on the VDU 21 from the second position 54b to the desired final position 54c by dragging the mouse 23 through corrective movement 56 to a new position 57 on a mouse mat, resulting in the associated corrective movement 58 being effected to the symbol 24, moving it to the desired final position 54c centred on circle 52. This is shown within FIG. 5. A user decision to physically input position data is assumed to indicate that the user wishes to move the symbol based on that data. Accordingly, when position data is input physically the symbol is moved based on this physically input data in preference to the gaze position information gathered by the gaze tracking system, which may indicate that the determined gaze position is not changing, and remains at the position 53.

Thus, the system may use the determined gaze position 53 of the user for large, or coarse, movement of the symbol 24, and the conventional mouse 23 subsequently used to gather physical movement inputs from the user for smaller, or fine, movement of the symbol 24.

In other examples visual gaze direction information may include the rate of movement of the gaze position, for example the hybrid mouse functionality allows for movement and positioning of the symbol 24 depending not just on where the user is looking but also on the rate of movement of the user's gaze position.

The hybrid mouse apparatus, which may be provided in part by software, needs to be able to distinguish between the different types of movements and to act accordingly. For instance, gross or sudden movements could be based upon the eye while small refinements of the cursor position would generally be done using a traditional mouse or pointing device, as would additional actions such as a button click. Hence the concept of a hybrid mouse.

Aspects of the apparatus discussed above in relation to calibration of the apparatus also apply to the use of the apparatus to control the position of a symbol 24 through a user's gaze position; i.e. the gaze tracker used in providing the calibration could be used in providing the hybrid mouse functionality.

Alternatively, a calibration could be transferred from one platform to another (for example if a user operates a different computer comprising the present claimed apparatus), where that transferred calibration could be used to provide hybrid mouse functionality on that different computer. In this case, the eye tracker and other parts of the apparatus are different units to those used in the calibration, but the calibration may still be used to provide hybrid mouse functionality.

In some examples, where a calibration is transferred from one computer to another the calibration may be warped to account for any differences between the gaze tracking system used for calibration and the gaze tracking system used in the hybrid mouse system.

In some examples, if a second person uses a computer with Hybrid functionality and a calibration for this person has not been determined but a calibration has been determined for a first person user, the second user may make use of the hybrid mouse functionality, without having to go through a full calibration process, by using the calibration for the first person. The calibration for the first user may be warped to allow the second user to use the first calibration. In some examples this may allow the second user to use the first user's calibration on the computer that the first user was using when the calibration for the first user was acquired. In some examples this may allow the second user to use a different computer.

Warping is required because as discussed above the position within a GUI rendered on a VDU 21 is determined from visual gaze direction information that includes information such as the distance the user sits from the VDU 21, the distance between the user's eyes, the orientation of the user's eyes (one eye may be higher than the other), characteristics of the user's eyes such as the curvature of the eye, the distance between the light sources 43, the exact position of the light sources 43 in relation to the VDU 21, the position of the camera 44 in relation to the VDU 21, the type of camera 43 used (different cameras may have different resolutions or different numbers of pixels, or different magnifications), and/or other information that comprises visual gaze direction information as discussed above.

This means that a calibration determined for a first user when operating a first computer may be used for the first user moving to a second user computer or for a second user using the first computer or even when using a second computer, but the determined gaze position in the GUI rendered on the VDU 21 may be offset from the position of the symbol 24 in the GUI rendered on the VDU 21. The offset between the determined gaze position and the implied gaze position, such as the position of an cursor 24 when a mouse button is clicked as discussed in relation to system calibration, may be substantially constant and this constant offset may be corrected leading to a 'warped' calibration that can be applied to the second computer and/or second user. The process of 'warping' may also involve the acquisition of new calibration data as described above, however generally less calibration data will be required in comparison to determining a calibration for a user without using a warping process.

According to the present apparatus, the system can determine where on the VDU 21 a user is looking from visual gaze direction information acquired by or associated with eye tracking/gaze tracking apparatus. The gaze/eye tracking apparatus determines or collects visual gaze direction information from the user. Visual gaze direction information may be determined or collected from one or both eyes, from which a gaze direction or gaze position, including the position within a GUI rendered on the VDU 21 may be determined; the calibration may also enable the apparatus to determine when the user is looking outside of the VDU—for example off to one side. Gaze position may be determined from the processing of visual gaze direction information collected or determined for both eyes together, or for each eye individually, thereby providing resilience within the apparatus—for example the gaze direction or position may still be determined if the eye tracker 'loses' one eye, meaning that visual gaze direction information may only then be determined for one eye. The necessary processing to determine the gaze position from the visual gaze direction information could be carried out within the computer associated with manipulation of visual content within the GUI rendered on the VDU 21 (e.g. a PC, laptop or work station), or within a dedicated processor.

In some examples, if a user 'loses' the cursor or symbol 24, meaning that the user does not know where the cursor is in the GUI presented on the VDU 21, the Hybrid Mouse functionality makes it easy to find the cursor. For example, the user by effecting a significant eye movement to a location on the GUI presented on the VDU 21 can make the cursor or symbol 24 move to that location. The user has then 'found' the cursor. Additionally or alternatively, the user in some examples can effect an action such as blinking one eye for a predetermined duration or blinking both eyes for a predetermined duration to effect control of the system. Such control may include moving the cursor or symbol 24 to a predetermined location, or swapping between different windows tiered within the GUI presented on the VDU 21, or other control such as opening an editing menu, or start-up menu; the person skilled in the art will appreciate that the Hybrid Mouse functionality is not limited to these examples and may be used to effect other control of the system.

As discussed above, because a person's eye is always in movement even when looking at a fixed position such as the symbol 24, visual gaze direction information or data are averaged over a short time period equivalent to a number of frames (or update events) to obtain visual gaze direction information or data to be used in determining a gaze position or direction. The number of frames may be 4 or may for example lie or between 2 and 10. In some examples the number of frames may however be greater than this number. The short time period over which visual gaze direction information are averaged is then equal to the reciprocal of the frame update rate multiplied by the number of frames over which the data are averaged.

In some examples, the user's gaze position is displayed in the GUI presented on the VDU 21.

Processing uses predetermined criteria to determine whether the position of the symbol 24 presented within the GUI rendered on the visual display unit is to be controlled based on physical movement information, such as movement of a conventional mouse on a mouse mat, or is to be controlled based on the gaze position of the user.

The default position may be that the conventional mouse has control of the symbol 24. This means that where it has not been determined that the user's gaze is to control the position of the symbol 24 within the GUI rendered on the VDU, the conventional mouse (or other symbol controlling means) has control of the symbol 24. This also means that even where it has been determined that a user's gaze is to control the position of the symbol within the GUI rendered on the VDU 21, if the user is at the same time moving the mouse or other physical input device, then the symbol 24 is controlled by the mouse 23. In general, it can be assumed that if the user is moving the conventional mouse 23, the user wishes the symbol to follow the movements of the mouse 23. Further, this stops the symbol 24 being fixed at a position that the user happens to be looking at, whilst they are moving a conventional mouse 23 to control the symbol 24. This means that when changing physical movement information is being collected from the user through the conventional mouse 23 or other symbol control means, the position of the symbol 24 within the GUI rendered on the VDU 21 may be controlled based on that physical movement information.

In some examples when physical movement information is being collected from the user through the conventional mouse 23 or other symbol control means, the position of the symbol 24 within the GUI rendered on the VDU 21 is always controlled based on that physical movement information.

The predetermined criteria used to determine whether control of the symbol 24 is to be based on gaze position may be based on identification of a significant change in the gaze position within the GUI rendered on the VDU 21. This is discussed below.

Similarly to the situation discussed in relation to the calibration apparatus, a person's eyes are continually in movement even when looking at an object. A significant change in gaze position may occur when looking from one object to another. However, whilst looking at an object, although the eye is continually in movement, the gaze position or direction may be centred on the object; the person's gaze may be considered to linger on the object for a short time. It is this information that is used to determine when the user then wishes the symbol to be positioned at that gaze position, which may be an average of the gaze position over a short time to account for the eyes continual movement. Averaging reduces noise and other errors in the system. Visual gaze direction information may be used, through appropriate processing, to determine the gaze position of one or both of the user's eyes. As discussed previously, eye movement for one or both eyes is determined by known gaze tracking or eye tracking technology so that visual gaze direction information can be used to determine the gaze position. The calibration as discussed above can be used.

Here, significant changes in gaze position include eye movement different to that associated with a user looking at a stationary or slowly moving, or piecewise continuous moving, object, symbol or content presented within a GUI rendered on the VDU 21. This means that the predetermined criteria from which the symbol 24 may be controlled by the gaze position means that the user has to move their gaze position significantly. A significant change in gaze position may require the gaze position to exceed a threshold movement distance and/or velocity before the symbol position may be changed based on the changed gaze position. This is to ensure that the symbol 24 is not moved, for example when a user is reading a line of text, or otherwise when their eyes may be drifting and not moving rapidly and/or significantly to a new region of interest where the user wishes the symbol to be repositioned or positioned.

A significant change in gaze position may be a change in gaze position associated with the user looking at positions within the GUI rendered on the VDU 21 separated by a significant dimension of the VDU 21, meaning that the significant change in gaze position is bigger than the hybrid mouse apparatus considers to be significant. A significant dimension of the VDU 21 may be user and/or application dependent. A significant dimension of the VDU 21 may depend on where and how a user is looking, for example the significant dimension of the VDU 21 may depend on how long a user's gaze lingers at a position or symbol, or area of symbols, even if not preceded by a significant eye movement. A significant dimension of the VDU 21 may be greater in a region of the GUI presented on the VDU 21 where there are no or few symbols, relative to a region of the GUI presented on the VDU 21 where there are a number of symbols. Therefore a significant dimension of the VDU 21 may or may not depend on a preceding significant eye movement. A significant dimension of the VDU 21 may be 5%, 10%, 25%, 30%, 35%, or more or less of the dimension of the VDU 21.

A significant change in gaze position may be customisable, but should be significant in comparison to expected variation in the accuracy of the system, σ. In one example, such a significant change in gaze position should be a distance greater than 4 σ. In one example, the accuracy of the system, σ, may be based on the inherent errors within the system combined with the variation in the gaze position over a short time, even when the user is looking at a fixed point due to the eye generally always being in motion. In some examples a significant change in gaze position may be less than σ, 1 σ, 2 σ, 3 σ or 4 σ. The significant change in gaze position required before the apparatus will move an symbol based on a change in determined gaze position may be of the order of 3 cm.

To further ensure that control of the symbol 24 is validly based on gaze position it is assumed that following a significant change in gaze position, associated with the user looking at a particular position within the GUI rendered on the VDU 21 where they wish the symbol 24 to be positioned based on their gaze, there will be then be at least a required short time period where the user's gaze lingers at that position. This may then be followed by a rapid and/or significant eye movement associated with the user looking at another position within the GUI rendered on the VDU 21.

The defined required short time period may be short. For a gaze tracking system operating at an update frame rate, a number of frames after a rapid and/or significant eye change in gaze position, when the eye is considered to be lingering at a region of interest may lie between a value of 1 and 10. This for example may be less than 0.1 seconds for a system operating at an update rate of 40-50 Hz. The time delay may be substantially less than this time or greater than this time.

Accordingly, if a user's gaze drifts significantly in position after a significant change in gaze, the symbol 24 is then not moved on the basis of the change in gaze position. In this situation, it is assumed that the user is looking at content displayed within a GUI rendered on the VDU 21 as part of their normal interaction with that content, and that the user does not require the symbol 24 to be moved based on their gaze position in this instance. This forms part of the predetermined criteria to determine when a symbol is to be moved or repositioned based on gaze information.

After the symbol 24 has been moved based on the user's gaze position, the predetermined criteria require that there needs to be a further significant change in gaze position before the symbol 24 is again moved based upon gaze position. As discussed above, after positioning the symbol 24 based on gaze position the user may use a conventional mouse 23 to reposition the symbol 24 a short distance to the desired position. However, they may also make a corrective movement of the symbol 24 based on gaze position.

In some examples the predetermined criteria is configured by the user, in other examples the predetermined criteria are learnt by the hybrid mouse apparatus, in other examples the predetermined criteria are adapted over time.

It is clear that from the above both during the calibration phase and Hybrid Mouse functionality phase, visual gaze direction information is collected continuously but it is used selectively.

In some examples, visual gaze direction information may not be collected continuously, for example when the gaze tracking system has 'lost' the position of a user's eyes and may need to enter a re-acquisition or boot-up phase.

The region of interest the user wishes to position the symbol at may be content such as a button on a taskbar presented within a GUI rendered on the VDU 21. In a similar manner to that described in relation to calibration, if the gaze position is very close to that content, for example overlaying the content but not exactly centred on the content, then the apparatus may assume that the user intended to position the symbol 24 at a position centred on that content. The symbol 24 is then positioned accordingly centred on the content within the GUI rendered on the VDU 21 such as a 'file open'. This position is still based on the determined gaze position of the user, but in this instance there then may not need to be any corrective further movement of the symbol 24 by the user, either based on gaze information or physical movement information, in the form of for example physical movement of a conventional mouse 23 on a mouse mat, because the symbol 24 is automatically moved to the position of the identified content of interest.

To summarise the above:

If there is a significant, for example rapid and/or large and/or sudden, change in gaze position, then this is a cue that the symbol 24 should be positioned on the basis of the gaze position because the gaze position may have moved to a new position corresponding to content of interest to the user.

If the gaze position is relatively static, and this was preceded by a significant change in gaze position, then this is a cue that the symbol/cursor 24 should be repositioned to the gaze position within the hybrid mouse apparatus.

If the eye gaze position is moving and/or drifting, indicating that the gaze position is moving, but this is not a significant movement, then this is not a cue that the symbol/cursor 24 is to be moved based on gaze position.

If the eye gaze position is erratic, indicating that the eye is moving but the gaze position is not consistent the movement is not significant, i.e. not sufficiently large and/or rapid and/or sudden, and as such could be minor deliberate eye movements or could be within the bounds of error in the system and/or caused by noise within the processing, then the symbol/cursor 24 is not moved based on gaze position.

In some examples, a rapid and/or significant change in determined gaze position includes a user looking fixedly at content in the GUI presented on the VDU 21, where this may be a significant position. For example where the user is looking fixedly at a particular element displayed on the GUI, such as an icon.

In some examples, a rapid and/or significant change in determined gaze position includes a small change in the determined position of the user's gaze. For example, if a user is looking at a position in the GUI presented on the VDU 21 that is relatively close to an symbol, such as a 'Bold' tab in a toolbar menu, and then the user's gaze moves to the position of the 'bold' tab, then this movement may be considered as a rapid and/or significant change in determined gaze position.

The system in the calibration phase or Hybrid Mouse functionality then can make the decision that the user is intentionally looking at this significant position. Therefore, even though the gaze position may have only moved a small distance, or not moved at all the gaze position is now at a significant position, and calibration data be acquired of the symbol, such as a cursor, moved to that significant position.

When using the 'hybrid mouse' in the hybrid mouse mode, further calibration data may be acquired, in the manner as discussed above, to lead to a calibration that is improved with time, as would be appreciated by the person skilled in the art.

The person skilled in the art will appreciate that the foregoing is not limited to the control and/or movement of an symbol 24 within a GUI rendered on the VDU 21 of a computer system, and could relate to multimedia screen projection systems, or any other appropriate visual content display technologies.

The above description includes examples having displays, such as a VDU, viewed from a distance by a user. In other examples displays may be mounted on a user's head, for example as part of a headset or a pair of goggles.

The calibration apparatus (and method of calibration), and Hybrid Mouse apparatus (and method of using the Hybrid Mouse) may use the same apparatus, but as clearly highlighted in the above description may use separate apparatuses. This means that aspects of the claimed apparatuses and methods do not need to be used together, where each may be used or operated separately.

The apparatus described above may be implemented at least in part in software. Those skilled in the art will appreciate that the apparatus described above may be implemented using general purpose computer equipment or using bespoke equipment.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Here, aspects of the methods and apparatuses described herein can be executed on a mobile station and on a computing device such as a server. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. An apparatus arranged to move a symbol presented on a visual display unit to a desire d position comprising,
    a processing means;
    a movement means configured to collect physical movement information from a user;
    a gaze direction means configured to collect visual gaze direction information and to determine gaze positions of the user;
    wherein the processing means is configured to selectively control the position of a symbol presented on a visual display unit based on either the physical movement information or the determined gaze positions;
    the processing means is configured to use predetermined criteria to determine whether the position of the symbol presented on the visual display unit is to be controlled based on the physical movement information or is to be controlled based on the determined gaze positions in order for the symbol presented on the visual display unit to be moved to the desired position;
    wherein the predetermined criteria is based on a combination of (i) a detection of a rapid and/or significant change from a first determined gaze position to a position on the visual display unit followed by lingering at the position to determine a second determined gaze position spaced apart from the first gaze position and (ii) absence of a change of physical movement information for a predetermined time;

wherein if the predetermined criteria are satisfied, control of the position of the symbol presented on the visual display unit is based on the determined gaze positions; and if the predetermined criteria are not satisfied, control of the position of the symbol presented on the visual display unit is based only on the physical movement information.

2. The apparatus according to claim 1, wherein the processing means is configured to use processed physical movement information to control the position of the symbol on the visual display unit.

3. The apparatus according to claim 1, wherein the rapid and/or significant change in the determined gaze positions comprises an eye movement exceeding one or both of a threshold movement distance and a threshold velocity as determined by the gaze direction means.

4. A method of moving a symbol presented on a visual display unit to a desired position comprising:

using a movement means to collect physical movement information from a user;

using a gaze direction means to collect visual gaze direction information and to determine gaze positions of the user;

using a processing means to selectively control the position of a symbol presented on a visual display unit based on either the physical movement information or the determined gaze positions;

wherein the processing means uses predetermined criteria to determine whether the position of the symbol presented on the visual display unit is to be controlled based on the physical movement information or is to be controlled based on the determined gaze positions in order for the symbol presented on the visual display unit to be moved to the desired position;

wherein the predetermined criteria is based on a combination of (i) a detection of a rapid and/or significant change from a first determined gaze position to a position on the visual display unit followed by lingering at the position to determine a second determined gaze position spaced apart from the first gaze position and (ii) absence of a change of physical movement information for a predetermined time;

wherein if the predetermined criteria are satisfied, control of the position of the symbol presented on the visual display unit is based on the determined gaze position; and if the predetermined criteria are not satisfied, control of the position of the symbol presented on the visual display unit is based only on the physical movement information.

5. The method according to claim 4, wherein the processing means is configured to use processed physical movement information to control the position of the symbol on the visual display unit.

6. The method according to claim 4, wherein a gaze tracker is used to collect the visual gaze direction information from the user.

7. The method according to claim 4, wherein the predetermined criteria to determine whether the position of the symbol presented on the visual display unit is to be controlled by physical movement information or is to be based on the determined gaze positions is based on a rapid and/or significant change in the determined gaze positions, wherein the rapid and/or significant change in the determined gaze positions comprises any one selected from the group consisting of: a change in gaze positions greater than a significant dimension of the visual display unit; a change in gaze positions greater than a threshold distance on the visual display unit; and a lingering second determined gaze position at the region of interest where the lingering second determined gaze position comprises a gaze position at the region of interest on the visual display unit for a short time period.

8. The method according to claim 7, wherein the threshold distance on the visual display unit comprises a function of the variation of between the determined gaze positions.

9. The method according to claim 4, wherein if physical movement information is being collected, control of the position of the symbol presented on the visual display unit is based on the physical movement information.

10. The method according to claim 4, wherein the rapid and/or significant change in the determined gaze positions comprises an eye movement exceeding one or both of a threshold movement distance and a threshold velocity as determined by the gaze direction means.

11. The apparatus arranged to determine a desired calibration useable to determine a user gaze position on a visual display unit from visual gaze direction information of a user, the apparatus comprising:

a processing means;

a movement means configured for collecting physical movement information from a user;

a gaze direction means configured for collecting visual gaze direction information from the user; wherein:

the processing means is configured for processing the physical movement information to control a position of a symbol presented on the visual display unit; and the processing means is configured for processing the visual gaze direction information from the user to determine a desired calibration by acquiring calibration data for significant and/or rapid user eye movements;

the determination of the desired calibration comprising;

the processing means comparing the visual gaze direction information with the position of the symbol presented on the visual display unit to determine the desired calibration; and wherein calibration data is not acquired after a significant and/or rapid eye movement if the user's eye movement is not relatively static for a short period of time following the significant and/or rapid eye movement.

12. The apparatus according to claim 11, wherein the processing means is configured to control the position of the symbol based on the processed physical movement information as part of the user's interaction with content presented on the visual display unit.

13. The apparatus according to claim 11, wherein comparing the visual gaze direction information with the position of the symbol presented on the visual display unit to determine the desired calibration comprises processing the visual gaze direction information from the user to determine an apparent user gaze position, and determining the difference between the apparent user gaze position and the position of the symbol.

14. The apparatus according to claim 11, wherein the desired calibration is determined based on an assumption that the gaze position of the user is located at the position of the symbol.

15. The apparatus according to claim 11, wherein the rapid and/or significant change in the determined gaze positions comprises an eye movement exceeding one or both of a threshold movement distance and a threshold velocity as determined by the gaze direction means.

16. A method of generating a desired calibration useable to determine a user gaze position on a visual display unit from visual gaze direction information of a user, the method comprising the following steps:
using a processing means;
using a movement means for collecting physical movement information from a user;
using a gaze direction means for collecting visual gaze direction information from the user by acquiring calibration data for significant and/or rapid user eye movements; wherein:
the processing means is configured to process the physical movement information to control a position of a symbol presented on the visual display unit; and
the processing means is configured to process the visual gaze direction information from the user to determine the desired calibration;
the generation of the desired calibration comprising;
the processing means comparing the visual gaze direction information with the position of the symbol presented on the visual display unit to determine the desired calibration; and
wherein calibration data is not acquired after a significant and/or rapid eye movement if the user's eye movement is not relatively static for a short period of time following the significant and/or rapid eye movement.

17. The method according to claim 16, wherein the processing means is configured to control the position of the symbol based on the processed physical movement information as part of the user's interaction with content presented on the visual display unit.

18. The method according to claim 17, wherein the user's interaction with content presented on the visual display unit comprises the step of controlling the position of the symbol to select content on the visual display unit.

19. The method according to claim 16, wherein processing the visual gaze direction information from the user to determine the desired calibration comprises the step of acquiring visual gaze direction information to be compared with the position of the symbol presented on the visual display unit following a rapid and/or significant eye movement or following a lingering eye movement.

20. The method according to claim 19, wherein a rapid and/or significant eye movement comprises eye movement consistent with looking at positions separated by a significant dimension of the visual display unit.

21. The method according to claim 16, wherein comparing the visual gaze direction information with the position of the symbol presented on the visual display unit to provide the desired calibration comprises the further step;
correlating the position or positions of the symbol on the visual display unit with the visual gaze direction information from the user.

22. The method according to claim 21, wherein correlating the position or positions of the symbol on the visual display unit with the visual gaze direction information from the user comprises linear regression.

23. The method according to claim 16, wherein comparing the visual gaze direction information with the position of the symbol presented on the visual display unit to determine the desired calibration comprises the steps of processing the visual gaze direction information from the user to determine an apparent user gaze position and determining the difference between the apparent user gaze position and the position of the symbol.

24. The method according to claim 16, wherein the rapid and/or significant change in the determined gaze positions comprises an eye movement exceeding one or both of a threshold movement distance and a threshold velocity as determined by the gaze direction means.

* * * * *